(12) United States Patent
Blumenau

(10) Patent No.: US 7,849,328 B2
(45) Date of Patent: Dec. 7, 2010

(54) SYSTEMS AND METHODS FOR SECURE SHARING OF INFORMATION

(75) Inventor: Steven Blumenau, Framingham, MA (US)

(73) Assignee: Iron Mountain Incorporated, Boston, MA (US)

( * ) Notice: Subject to any disclaimer, the term of this patent is extended or adjusted under 35 U.S.C. 154(b) by 1072 days.

(21) Appl. No.: 11/555,236

(22) Filed: Oct. 31, 2006

(65) Prior Publication Data

US 2007/0113293 A1 May 17, 2007

(51) Int. Cl.
G06F 12/14 (2006.01)
(52) U.S. Cl. .......................................... 713/189; 726/26
(58) Field of Classification Search ........................ None
See application file for complete search history.

(56) References Cited

U.S. PATENT DOCUMENTS

| | | | | |
|---|---|---|---|---|
| 5,978,484 | A * | 11/1999 | Apperson et al. | 705/54 |
| 6,052,780 | A * | 4/2000 | Glover | 713/193 |
| 6,567,830 | B1 * | 5/2003 | Madduri | 715/235 |
| 6,889,211 | B1 | 5/2005 | Yoshiura et al. | |
| 7,181,468 | B2 | 2/2007 | Spring et al. | |
| 7,216,289 | B2 | 5/2007 | Kagle et al. | |
| 7,249,383 | B1 | 7/2007 | McCully et al. | |
| 2001/0052078 | A1 * | 12/2001 | Kuroda et al. | 713/193 |
| 2002/0023010 | A1 * | 2/2002 | Rittmaster et al. | 705/26 |
| 2002/0026435 | A1 | 2/2002 | Wyss et al. | |
| 2002/0033844 | A1 | 3/2002 | Levy et al. | |
| 2002/0077985 | A1 | 6/2002 | Kobata et al. | |
| 2002/0133557 | A1 | 9/2002 | Winarski | |
| 2002/0143775 | A1 | 10/2002 | Wilkinson et al. | |
| 2002/0143819 | A1 | 10/2002 | Han et al. | |
| 2002/0146122 | A1 * | 10/2002 | Vestergaard et al. | 380/231 |
| 2002/0178229 | A1 | 11/2002 | Sinha et al. | |

(Continued)

FOREIGN PATENT DOCUMENTS

WO    WO 2004/055702 A1    7/2004

(Continued)

OTHER PUBLICATIONS

Amit Sawarkar, "Digital Asset Management", Digital Media Solutions Center, XP-002198865, May 22, 2001.

(Continued)

*Primary Examiner*—Kambiz Zand
*Assistant Examiner*—Peter Poltorak
(74) *Attorney, Agent, or Firm*—BainwoodHuang

(57) ABSTRACT

Systems and methods for managing digital assets in a distributed computing environment are described. Meta-data for the digital assets is stored separately from the digital assets. Meta-data for some of the digital assets is copied and stored at a central location. Meta-data for the digital assets is generated by clients of the system. A method for providing secure restricted access to a digital asset includes: encrypting, by a first computing device, a digital asset; creating, by the first computing device, an executable file, the executable file comprising the encrypted digital asset, permission information associated with the digital asset, and executable code for decrypting and viewing the digital asset; creating, by the first computing device, a digital signature corresponding to the executable file; and transmitting, to a second computing device, the executable file and the digital signature. Corresponding systems and computer readable media with executable instructions are also described.

24 Claims, 21 Drawing Sheets

U.S. PATENT DOCUMENTS

| | | |
|---|---|---|
| 2002/0178271 A1 | 11/2002 | Graham et al. |
| 2002/0188841 A1 | 12/2002 | Jones et al. |
| 2002/0194480 A1 | 12/2002 | Nagao |
| 2003/0012183 A1 | 1/2003 | Butler et al. |
| 2003/0023695 A1 | 1/2003 | Kobata et al. |
| 2003/0097571 A1 | 5/2003 | Hamilton et al. |
| 2003/0110126 A1 | 6/2003 | Dunkeld et al. |
| 2003/0115150 A1 | 6/2003 | Hamilton et al. |
| 2003/0130993 A1 | 7/2003 | Mendelevitch et al. |
| 2003/0140034 A1 | 7/2003 | Probst et al. |
| 2003/0225701 A1* | 12/2003 | Lee et al. .................. 705/57 |
| 2003/0231207 A1 | 12/2003 | Huang |
| 2004/0015408 A1 | 1/2004 | Rauen et al. |
| 2004/0039754 A1 | 2/2004 | Harple, Jr. |
| 2004/0133545 A1 | 7/2004 | Kiessig et al. |
| 2004/0133923 A1 | 7/2004 | Watson et al. |
| 2004/0177319 A1 | 9/2004 | Horn |
| 2004/0187111 A1 | 9/2004 | Eakin |
| 2004/0205481 A1* | 10/2004 | Zuniga et al. ............ 715/500.1 |
| 2005/0004875 A1 | 1/2005 | Kontio et al. |
| 2005/0038707 A1 | 2/2005 | Roever et al. |
| 2005/0120025 A1 | 6/2005 | Rodriguez et al. |
| 2005/0125355 A1 | 6/2005 | Fein |
| 2005/0131945 A1 | 6/2005 | Muller et al. |
| 2005/0198158 A1 | 9/2005 | Fabre et al. |
| 2005/0223242 A1* | 10/2005 | Nath ........................... 713/193 |
| 2005/0246686 A1 | 11/2005 | Seshadri et al. |
| 2006/0015637 A1 | 1/2006 | Chung |
| 2006/0020984 A1 | 1/2006 | Ban et al. |
| 2006/0059253 A1 | 3/2006 | Goodman et al. |
| 2006/0106754 A1 | 5/2006 | Blumenau et al. |
| 2006/0106782 A1 | 5/2006 | Blumenau et al. |
| 2006/0106811 A1 | 5/2006 | Blumenau et al. |
| 2006/0106812 A1 | 5/2006 | Blumenau et al. |
| 2006/0106813 A1 | 5/2006 | Blumenau et al. |
| 2006/0106814 A1 | 5/2006 | Blumenau et al. |
| 2006/0106834 A1 | 5/2006 | Blumenau et al. |
| 2006/0106862 A1 | 5/2006 | Blumenau et al. |
| 2006/0106883 A1 | 5/2006 | Blumenau et al. |
| 2006/0106884 A1 | 5/2006 | Blumenau et al. |
| 2006/0106885 A1 | 5/2006 | Blumenau et al. |
| 2007/0110044 A1 | 5/2007 | Barnes et al. |
| 2007/0112784 A1 | 5/2007 | Blumenau |
| 2007/0113288 A1 | 5/2007 | Blumenau |
| 2007/0113289 A1 | 5/2007 | Blumenau et al. |
| 2007/0113293 A1 | 5/2007 | Blumenau |
| 2007/0130127 A1 | 6/2007 | Passmore et al. |
| 2007/0130218 A1 | 6/2007 | Blumenau |
| 2007/0208685 A1 | 9/2007 | Blumenau |
| 2007/0266032 A1 | 11/2007 | Blumenau |

FOREIGN PATENT DOCUMENTS

| | | |
|---|---|---|
| WO | WO 2006/055758 A2 | 5/2006 |
| WO | WO 2006/055758 A3 | 5/2006 |
| WO | WO 2008/055218 A2 | 5/2008 |

OTHER PUBLICATIONS

International Search Report for PCT/US2005/041773 mailed May 29, 2006.

Written Opinion of the International Searching Authority for PCT/US2005/041773 mailed May 29, 2006.

Applicant directs the Examiner's attention to the following related U.S. Appl. No. 11/555,260, filed on Oct. 31, 2006.

* cited by examiner

SYSTEMS AND METHODS FOR SECURE SHARING OF INFORMATION

FIELD OF THE INVENTION

The invention relates to managing digital assets in a distributed computing environment. More specifically, the invention relates to storing meta-data about the digital assets separate from the digital assets.

BACKGROUND OF THE INVENTION

Centralized document management and other centralized applications can ease digital asset management tasks. However, these tools are expensive, difficult to install and configure, and require end-users to change the manner in the way they work and interact with each other. These solutions are also very dependent upon the end-users to self-enforce corporate governance policies with respect to the digital assets that they create.

The centralized file control mechanism used by these present solutions typically requires end-users to use a burdensome check-in/check-out process to obtain files. However, many end-users prefer not to give up control of their digital assets, are unwilling to sacrifice the ability to use their laptops when they are detached from the corporate network, and resist the workflow requirements of centralized systems. This leaves open the potential for many files located on file servers, laptops, desktops, personal digital assistants (PDAs), and other computing devices to remain outside the controls of the digital asset management system.

Additional drawbacks of current centralized document management tools include: the inability to categorize all digital assets on a local storage device to a desktop or laptop; the poor quality of existing categorization techniques when used within a structured context; the inability to provide effective automated control over categorization of digital assets outside of the central repository, as they are created and changed; the inability to request categorization information from the end-user in regard to locally stored information; the inability to selectively record categorization information based on the conceptual value of the assets; and the lack of category maintenance as assets are copied, moved, renamed, deleted and restored outside of the central repository.

There is, therefore, a conflict between the benefits of centralized file management and end user behavior with local information; a tension which limits the amount of information that will be captured by a centralized document management system.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description presented below.

As a general introduction, the invention includes a computer software system for gathering and recording categorization data when a digital asset (e.g., file, voice-mail, instant message log, e-mail, and the like) or a digital asset container (e.g., folder, directory, disk drive, removable storage medium, and the like) is created. The system executes in a pre-emptive multi-tasking environment. In various embodiments, the software system provides the following features: information organization, secure sharing of information, simplified information archival, risk-based information management, verifiable audit records, filtering of file system I/O, automatic categorization of digital assets, digital asset policy reconciliation, exception handling, cross-system asset tag propagation, and defining of asset tag attributes.

The present invention relates to creating an application executable which allows for secure sharing of a document or other resource with a potentially untrusted party. The application may prevent an end user from editing, modifying, copying, or printing the resource. The resource file is then included within the executable, in encrypted form, such that the resource cannot be accessed except through the application.

In one aspect, the present invention is a method for providing secure restricted access to a digital asset. In one embodiment, the method includes encrypting, by a first computing device, a digital asset; creating, by the first computing device, an executable file, the executable file comprising the encrypted digital asset, permission information associated with the digital asset, and executable code for decrypting and viewing the digital asset; creating, by the first computing device, a digital signature corresponding to the executable file; and transmitting, to a second computing device, the executable file and the digital signature.

In a second aspect, the present invention is a system for providing secure restricted access to a digital asset. In one embodiment, the system includes a processor which encrypts a digital asset; creates an executable file, the executable file comprising the encrypted digital asset, permission information associated with the digital asset, and executable code for decrypting and viewing the digital asset; and creates a digital signature corresponding to the executable file; and a file system driver in communication with the processor which writes the executable file and the digital signature to a memory element.

In a third aspect, the present invention is a computer readable medium having executable instructions thereon to provide secure restricted access to a digital asset. In one embodiment, the computer readable medium includes instructions to encrypt, by a first computing device, a digital asset; instructions to create, by the first computing device, an executable file, the executable file comprising the encrypted digital asset, permission information associated with the digital asset, and executable code for decrypting and viewing the digital asset; instructions to create, by the first computing device, a digital signature corresponding to the executable file; and instructions to transmit, to a second computing device, the executable file and the digital signature.

Additional features and aspects of various embodiments of the invention are described in greater detail below.

BRIEF DESCRIPTION OF THE DRAWINGS

The advantages of this invention, described above, and further advantages, may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention provides systems and methods for managing digital assets in a distributed computing environment (DCE). The invention relates generally to the collection, recording and maintenance of meta-data that identifies and categorizes stored digital assets for later location, retrieval and application of business controls. The term meta-data and asset identification tag are used synonymously throughout the specification to refer to the information that is created and used by the present invention to identify and categorize digital assets. Although some of the meta-data created by the present invention corresponds to known meta-data of a file system (e.g., the i-node associated with a file by the Unix operating system or a Master File Table Record used by the WINDOWS operating system, manufactured by Microsoft Corporation of Redmond, Wash.) the meta-data of the present invention supplements and extends the known file system meta-data.

Figure 1:
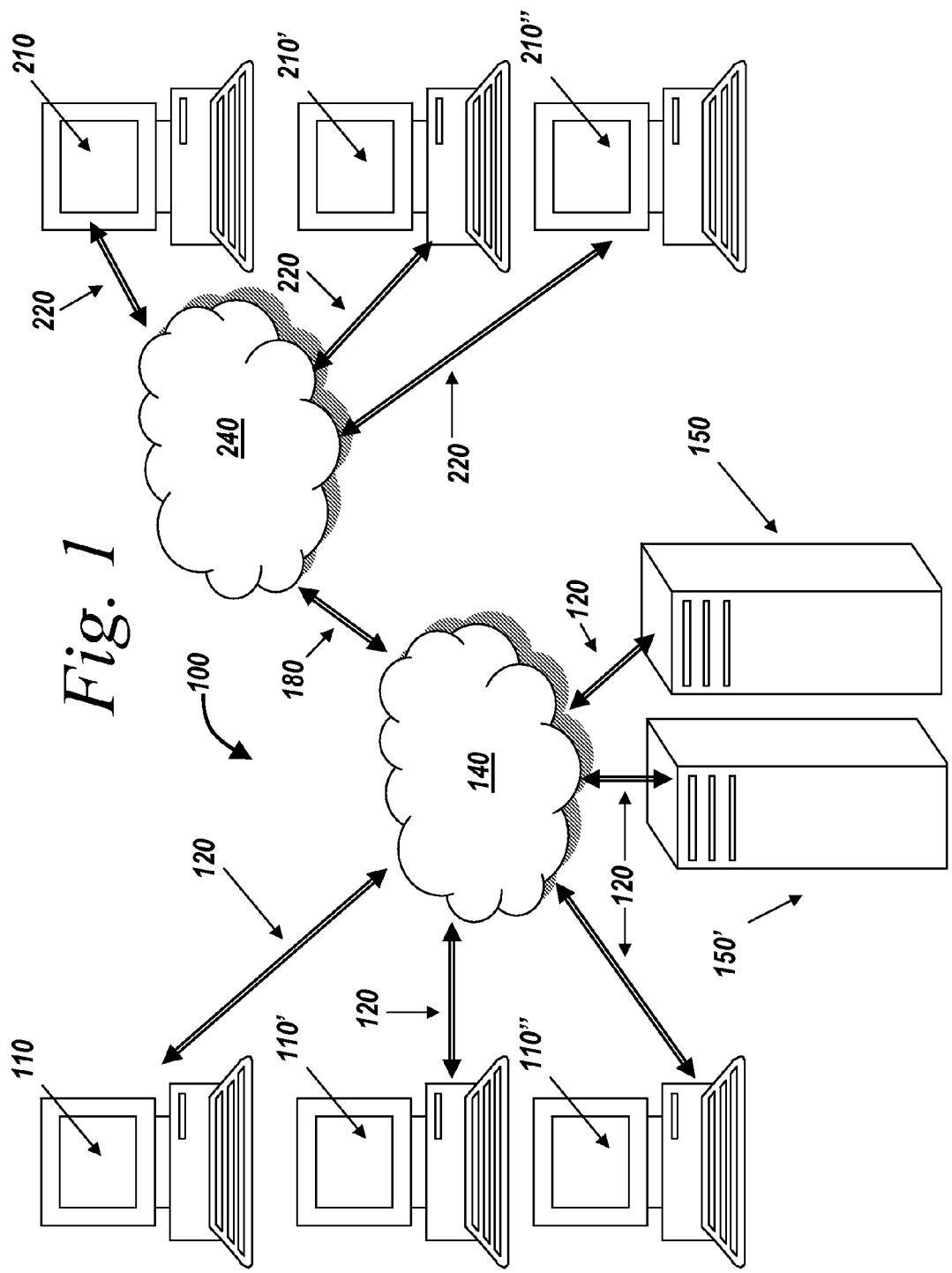
FIG. 1 shows an embodiment of a distributed computing environment (DCE).

With reference to FIG. 1, a distributed computing environment (also referred to as a client/server system) 100 in which principles of the present invention can be practiced includes one or more clients 110, 110', 110" (hereinafter each client or plurality of clients is generally referred to as 110) in communication with one or more servers 150, 150' (hereinafter each server or plurality of servers is generally referred to as 150) via communications network 140 through communications links 120. The communications network 140 can be a local-area network (LAN), a medium-area network (MAN), or a wide area network (WAN) such as the Internet or the World Wide Web. The communication links 120 can be a variety of connections including standard telephone lines, LAN or WAN links (e.g., T1, T3, 56 kb, X.25), broadband connections (e.g., ISDN, Frame Relay, ATM), and wireless connections (e.g., IEEE 802.11). The clients 110 and servers 150 communicate through the network 140 using a variety of communication protocols (e.g., TCP/IP, IPX, SPX, NetBIOS, NetBEUI, and direct asynchronous protocols).

Additionally, the clients 110 can communicate with other clients 210, 210', 210" (hereinafter each other client or plurality of other clients is generally referred to as 210), which can be connected to a second network 240, through a communication link 180 that connects network 140 to the second network 240. The protocols used to communicate through communications link 180 can include any variety of protocols used for long haul or short transmission. For example, TCP/IP, IPX, SPX, NetBIOS, NetBEUI, SONET and SDH protocols.

The client 110 can be any personal computer, Windows-based terminal, Network Computer, wireless device, information appliance, RISC Power PC, X-device, workstation, minicomputer, main frame computer, cellular telephone or other computing device that provides sufficient faculties to execute client software and an operating system. Client software of the invention facilitates the creation of meta-data that identifies, categorizes, and characterizes the digital assets generated and stored by the client. As used herein, digital asset refers to any digital file that can be stored in a storage medium. Examples of digital assets can include, but are not limited to, files, e-mails, instant messages (IM), audio files, video files, profiles, drivers, programs, and other electronic embodiments of information.

The server 150 can be any type of computing device that is capable of communication with the client 110. For example, the server 150 can be a traditional server computing device, a web server, an application server, a DNS server, or other type of server. Additionally, the server 150 can also be a client 110 (e.g., in an ad-hoc or peer-to-peer (P2P) network arrangement). One purpose of the server 150 is receiving, storing, and managing meta-data associated with the digital assets of the clients 110. The sever 150 can also provide a means to modify and update a taxonomy used to categorize and create meta-data for the digital assets, request that the client perform operations on its stored digital assets, and generate reports on the state of the stored meta-data. One example of a server 150 that can be used with the invention is a DELL server class computer having 1 gigabyte of RAM, dual central processing units, a 250 gigabyte hard drive, and an network interface card. It should be understood that more than one server 150 can be used with the present invention. In such a configuration, functionality can be distributed across the servers 150 or each server 150 can provide a full suite of functionality.

Figure 2A:
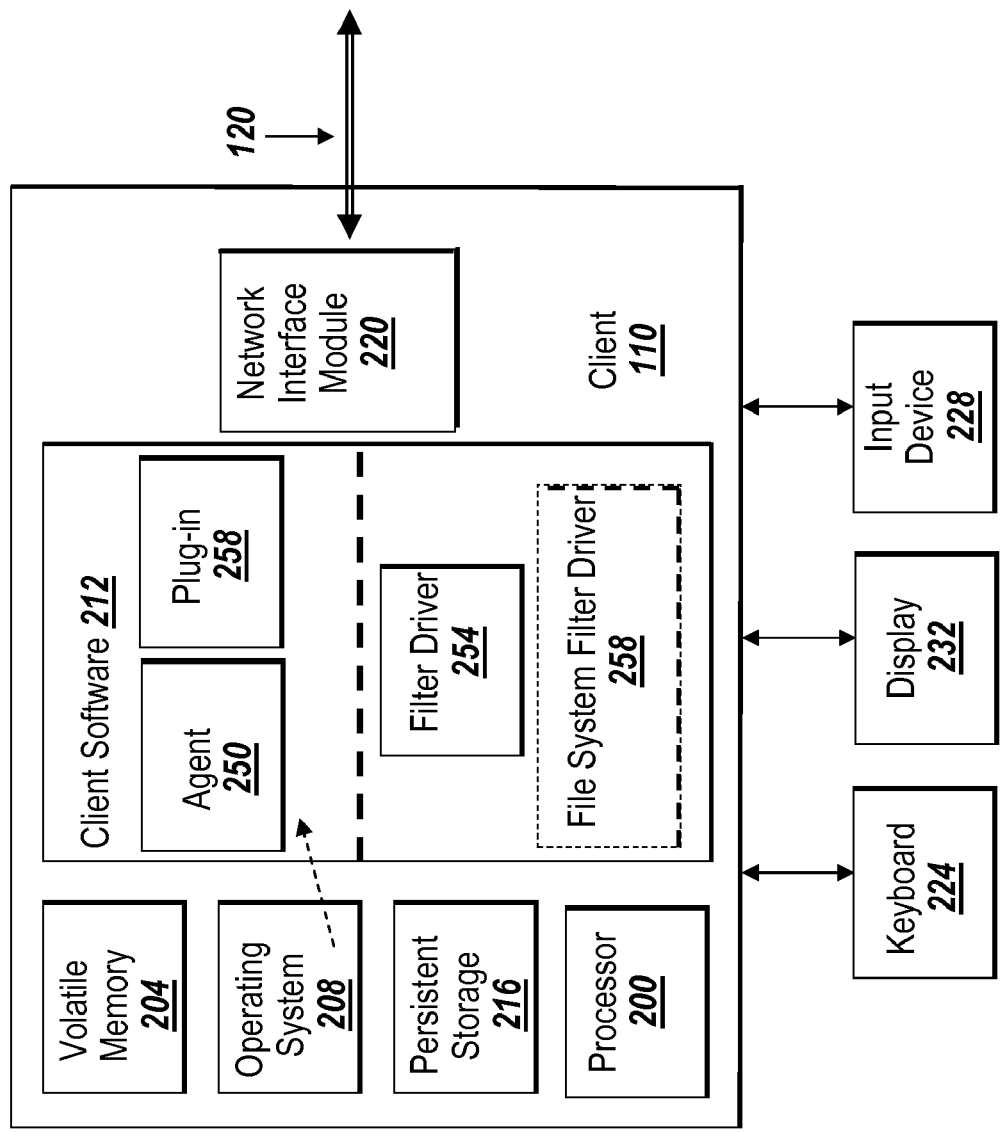
FIG. 2A shows an embodiment of a client of the DCE of FIG. 1.

FIG. 2A depicts a conceptual block diagram of a client 110 of the distributed computing environment 100. Each client 110 typically includes a processor 200, volatile memory 204, an operating system 208, client software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device), and a display 232. The operating system 208 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINSPIRE, LINUX, SMARTPHONE OS, and the various forms of UNIX.

The client software 212 is in communication with various components of the client 110 to provide features of the invention. In one embodiment, the client software 212 includes an agent 250, one or more filter drivers 254, and one or more plug-in modules 258. It should be understood that the client software 212 can include some or all of the components shown and described. As a general overview, the client software 212 provides a means to create, edit, maintain, update, revise, modify, and produce meta-data that provides categorization and identification of digital assets. The meta-data is associated with some or all of the digital assets created or stored on the client 110 and is used to provide tracking, locating, searching, and other features and aspects of the invention.

The agent 250 operates in the "user space" of the operating system 208 as do a various plug-in (also referred to as Add-in) modules 258. The agent 250 and plug-ins 258 are in communication with the various filter drivers 254, which operate in the "system space" of the operating system. Although shown in user space, it should be understood that in certain embodiments, the agent 250 can operate in the system space as well. The cooperation of the agent 250, the filter drivers 254, and the plug-in modules 258 provide the end-user of the client 110 with the features and operational characteristic of the invention. These features can be invisible to the end-user (e.g., automatic categorization of digital assets) or require end-user input through a graphical user interface (GUI) (e.g., end-user categorization). For example, when a request to create a folder is executed, the filter driver 254 intercepts the command. The filter driver 254 communicates with the agent 250. In response, the agent 250 displays a graphical dialog and asks the end-user for meta-data information (e.g., categorization information). In one embodiment, the client software 212 also interacts with a file system filter driver 258 that is provided as part of the operating system 208. In another embodiment, the client software 212 replaces the file system filter driver 258 provided by the operating system 208.

During certain modes of operation, the client software 212 intercepts file system commands and performs various functions of the invention in response thereto. For example, prior to adding a new digital asset to the file system of the client 110 the client software 212 intercepts the file system command to create the digital asset and requires the end-user to provide at least a portion of the meta-data (e.g., categorization information) associated with the digital asset. Or, for example, only prior to adding a new folder to the file system of the client 110 the client software 212 intercepts the file system command to create the digital asset and requires the end-user to provide at least a portion of the meta-data (e.g., categorization information) associated with the folder, which any assets added to the folder may then inherit. After the client software 212 applies the meta-data, the digital asset is added to the file system of the client 110. Another feature the client software provides is the generation of a digital identifier that is associated with digital asset as part of the meta-data. The categorization information and digital identifier form, in one embodiment, the meta-data that is associated with the digital asset. Another exemplary feature provided by the client software 212 is to perform a search or locate. The end-user of the client issues a search or locate command, the client software 212 intercepts this command and provides a "virtualized" view of the contents of the file system of the client 110. Each of these examples is explained below in more detail.

The associated meta-data for each digital asset may or may not be forwarded to the server 150 via network interface module 220 and communications link 120. Whether the meta-data for the digital asset is transmitted to the server for storage depends on the categorization and rules applied to the digital assets. This provides for granular control of certain digital assets of interest.

Figure 2B:
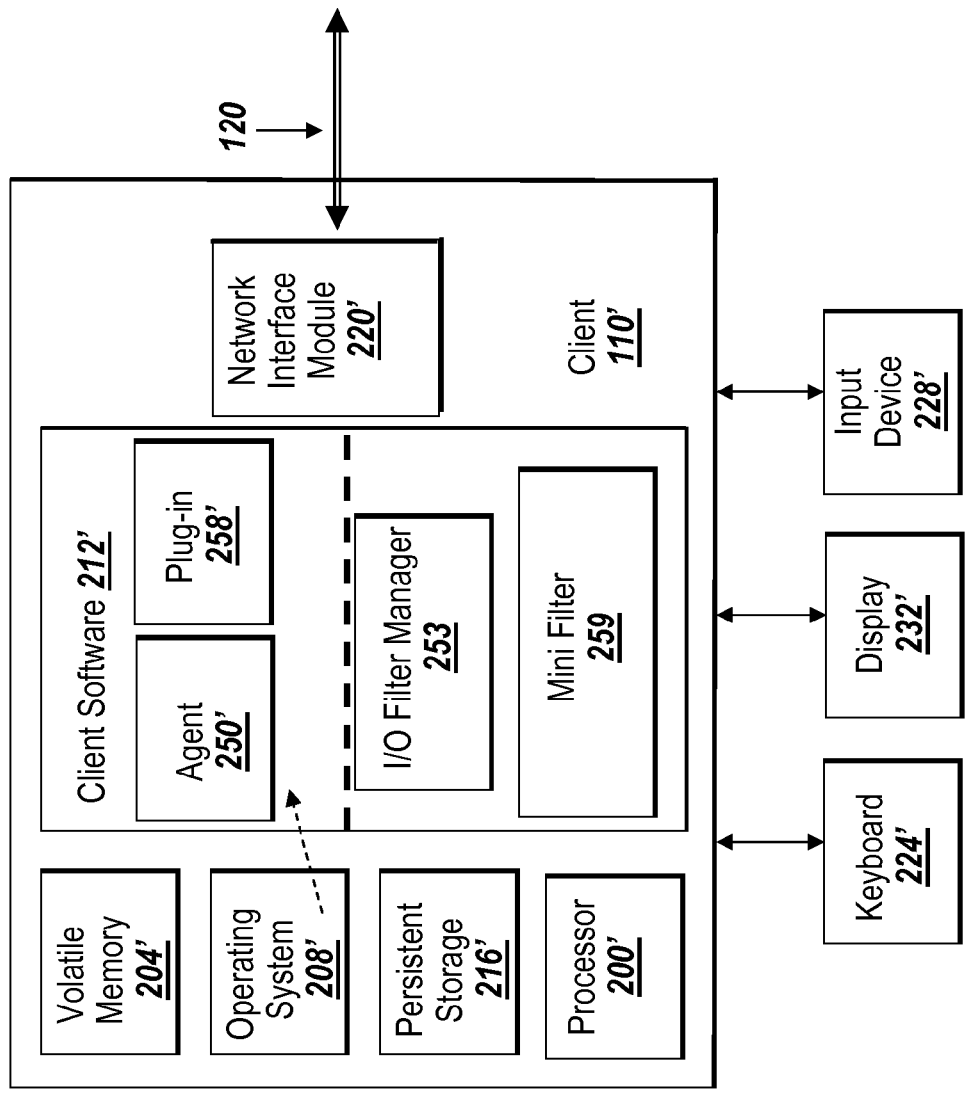
FIG. 2B shows another embodiment of a client of the DCE of FIG. 1.

FIG. 2B depicts another embodiment of a conceptual block diagram of a client 110' of the distributed computing environment 100. Each client 110' typically includes a processor 200', volatile memory 204', an operating system 208', client software 212', a persistent storage memory 216' (e.g., hard drive or external hard drive), a network interface 220' (e.g., a network interface card), a keyboard 224' or virtualized keyboard in the case of a PDA, at least one input device 228' (e.g., a mouse, trackball, space ball, light pen and tablet, touch screen, stylus, and any other input device), and a display 232'. The operating system 208' can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, Java, PALM OS, SYMBIAN OS, LINSPIRE, LINUX, SMARTPHONE OS, and the various forms of UNIX.

The client software 212' is in communication with various components of the client 110' to provide features and operational functions described below. In one embodiment, the client software 212' includes an agent 250', one or more mini-filters 259, and optionally one or more plug-in modules 258'. It should be understood that the client software 212' can include some or all of the components shown and described. As a general overview, the client software 212' provides a means to create, edit, maintain, update, revise, modify, and produce meta-data that provides categorization and identification of digital assets. The meta-data is associated with some or all of the digital assets created or stored on the client 110' and is used to provide tracking, locating, searching, and other features and aspects of the invention.

The agent 250' operates in the "user space" (also referred to as user-mode) of the operating system 208' as do the one or more optional plug-in (also referred to as Add-in) modules 258'. The agent 250' and plug-ins 258' are in communication with the mini-filter 259, which operates in the "system space" (which is also referred to as kernel-mode) of the operating system. Although shown in user space, it should be understood that in certain embodiments, the agent 250' can operate in the system space as well. The cooperation of the agent 250', the mini-filter 259, and the optional plug-in modules 258 provide the end-user of the client 110 with the features and operational characteristics described below. These features can be invisible to the end-user (e.g., automatic categorization of digital assets) or require end-user input through a graphical user interface (GUI) (e.g., end-user categorization). For example, when a request to create a folder is executed, the mini-filter 259 receives the command from the I/O filter manager 253. The mini-filter 259 communicates the request to the agent 250'. In response, the agent 250 applies categorization and other information of the meta-data to the created folder, without intervention by the end-user of the client 110'. That is, the creation of the meta-data occurs automatically and invisibly to the end-user.

During certain modes of operation, the client software 212 receives file system commands and performs various functions of the invention in response thereto. More specifically, the I/O filter manager 253 receives system I/O and communicates the system I/O to the mini-filter 259. The mini-filter 259 evaluates a hierarchical rule set, which is described in more detail below, and performs one or more actions on the received I/O. In one embodiment, the mini-filter 259 can pass the received I/O to the agent 250'. In another embodiment, the mini-filter does not communicate the received I/O to the agent 250'. The application of the hierarchical rule set by the mini-filter 259' to the received I/O reduces the number of I/O requests that are operated on by the agent 250'. This feature reduces the overall computational load generated by the client software 212'. A simple example highlights the benefit of this feature.

Assume an end-user is applying an operating system update to the client 110'. If the mini-filter 259 was not in operation, the agent 250', in some embodiments, would automatically apply categorization information and generate a digital asset identification tag for each new or updated file resulting from the application of the patch. By applying a hierarchical rule set to system I/O using the mini-filter 259, each of these I/O requests is not passed to the agent 250' and thus not operated on by the agent 250'. Although described as include and exclude functions, the mini-filter 259 can perform any set of actions that my be performed by kernel-mode or user-mode In one embodiment, the hierarchical rule set is a numerical hierarchical rule set. The numerical rule set can be expressed as a two-dimensional array starting at 0,0 and ending at 255, 255. Each ordered pair has a major digit (i.e., the first) and a minor digit (i.e., the second). Although described as a two-dimensional array, other array dimensions can be used. Continuing with the example above, an example of a rule set is shown in Table 1 below.

TABLE 1

| Array | Rule |
| --- | --- |
| 0, 0 | Include C:\ |
| 5, 0 | Exclude C:\Program |
| 5, 1 | Exclude C:\Windows |
| 10, 0 | Include C:\Program Files\Office |
| 128, 0 | Include C:*.doc |
| 240, 0 | Exclude wgad.txt |

In some instances, the I/O request can require application of more than one of the hierarchal rules. For example if the I/O request was to create TEST.DOC in the C:\Program directory, a conflict exists for that I/O request. Rule 5,0 requires the exclusion of writes to the C:\Program directory, but rule 128,0 requires the inclusion of all ".doc" files. In one embodiment, the mini-filter 259 resolves the conflict in favor of the highest ordered rule using the major digit first and the minor digit second. Applying this rule to the example, results in TEST.DOC being passed to the agent of further operation thereon (e.g., the creation of the meta-data without end-user intervention). In other embodiments, the lowest ordered rule wins. Various other conflict resolution schemes can also be used.

Figure 2C:
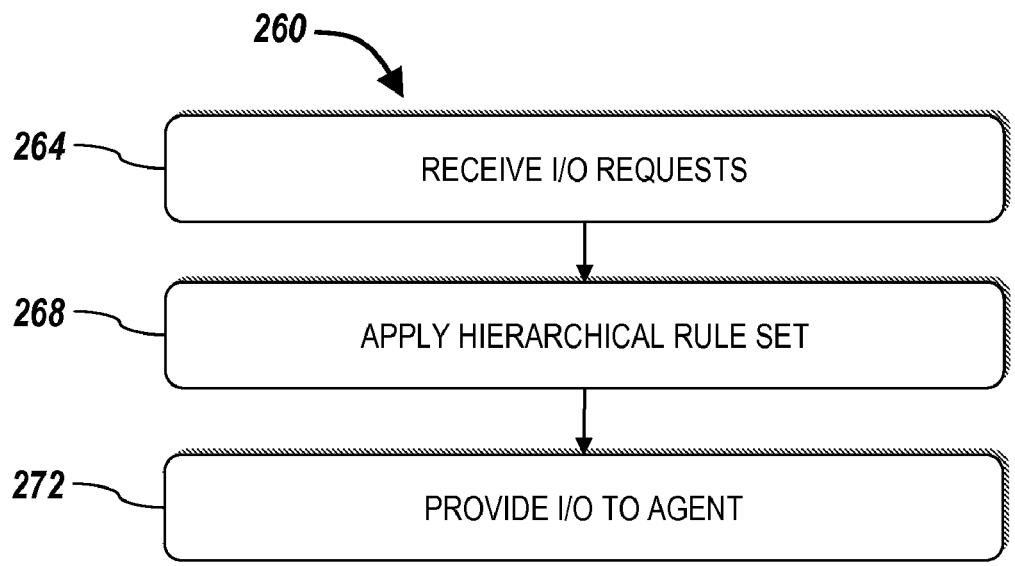
FIG. 2C shows an embodiment of a method of filtering I/O of a client.

With reference to FIG. 2C, an embodiment of a method 260 of filtering I/O requests of a computer system is described. The method includes receiving (step 264) a plurality of I/O requests, applying (step 268) a hierarchical rule set to the I/O, and providing (step 272) the filtered I/O to the agent 250'.

In one embodiment, the mini-filter 259 receives (step 264) the I/O requests from the I/O filter manger 253 of the client 110'. The filter manager 253 executes in the kernel mode of the operating system 208' of the client 110'. In one embodiment, the I/O filter manager 253 is a file system filter driver provided by Microsoft as part of an operating system 208'. In other embodiments, the I/O filter manger 253 is provided by another third party or is provided as part of the client software 212'.

The mini-filter 259 receives the I/O commands from the I/O filter manager 253 and applies (step 268) a hierarchical rule set to the received I/O. In one embodiment, the mini-filter 259 operates in the kernel mode of the operating system. Functions provided by the mini-filter can include but are not limited to: including, excluding, modifying, generating, deleting, I/O requests as well as other functions. In one embodiment, the hierarchical rule set is expressed using the extensible markup language (XML). In other embodiment, the hierarchical rule set is expressed using another language.

After applying the hierarchical rule set to the received I/O, the mini-filter 253 communicates the filtered I/O requests to the agent 250' for further processing. The communication can occur using inter-process communication or some other method.

Figure 3:
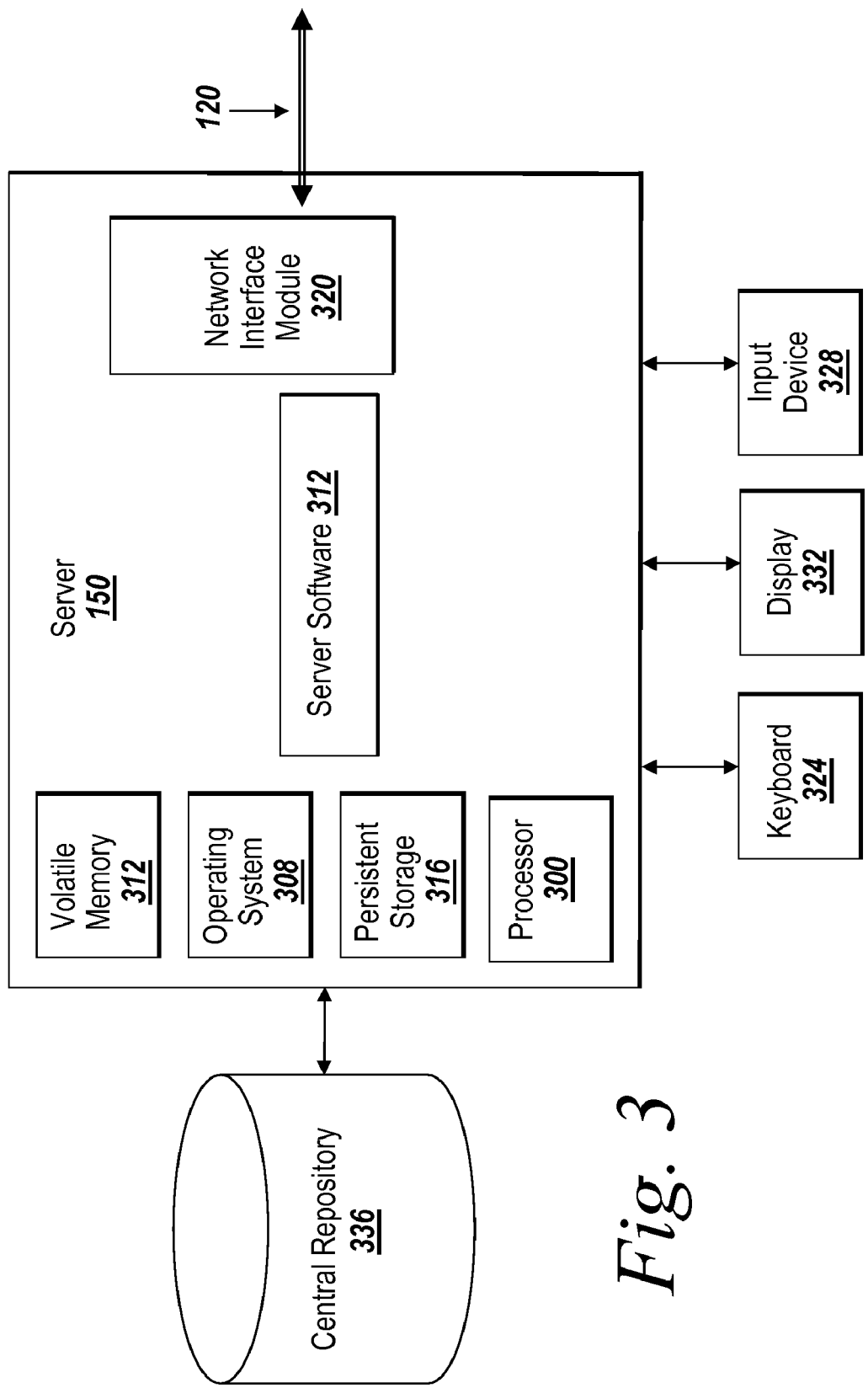
FIG. 3 shows an embodiment of a server of the DCE of FIG. 1.

With reference to FIG. 3, an embodiment of a server 150 for user in the distributed computing environment 100 is described. The server 150 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. The server operating system can include, but is a not limited to, WINDOWS XP, WINDOWS 2000 SERVER, WINDOWS 2000 ADVANCED SERVER, WINDOWS NT SERVER, WINDOWS NT SERVER ENTERPRISE EDITION, MACINTOSH OS X SERVER, LINUX, UNIX, SOLARIS, VMWARE, and the like.

A central repository 336 (e.g., a database) is in communication with the server 150. Although shown as separate from the server 150, it should be understood that the central repository 336 can be integral with the server 150 or located elsewhere within the distributed computing environment 100. The central repository 336 is configured to store meta-data associated with certain digital assets. In one embodiment, the digital assets and their associated meta-data are stored at the clients 110 and a copy of the associated meta-data is stored at the central repository 336. This provides a "decentralized" digital asset management system, which enables certain features and advantages of the invention. For example, by not storing the digital assets themselves at the central repository 336 the end-users are not required to check-out and check-in the digital assets in order to perform operations on the digital assets.

Additionally, the communication link 120 that connects the client 110 to the server 150 does not need to be maintained thereby tethering the client 110 to the server 150. Said another way, the communication link can be established on an "as-needed" basis. This feature allows the end-user to work "off-line" with the digital assets of interest and upload changes to the meta-data when a connection to the central repository 336 is established. Additionally, changes to the meta-data for a digital asset can be downloaded from central repository 336 when a connection is established. Also, various policies associated with the meta-data of the digital assets can require performance of specific tasks when the client 110 connects to the server 150. it should be understood that when the client 110 connects to the server 150 these tasks are executed.

In certain embodiments, the server software 312 provides a means to perform certain features of the invention. For example, the server software 312 allows an administrator to create and modify an adaptive taxonomy that is used to create categorization information for a digital asset. Also, the server software 312 propagates different meta-data sets for the same digital asset to each client 110 having a copy of the digital asset. The clients 110, in turn, perform a union of the different meta-data sets. In other embodiments, the server software 312 cooperates with the client software 212 to enable other features of the invention. For example, an administrator can issue a command using the server software 312 to copy certain digital assets to a central location in an effort to produce documents required in litigation. An example of a function that is performed by the client software 212, but can also be provided by the server software 312 is the ability to perform a union of meta-data for a digital asset and propagate a selected characterization for that digital asset. Each of these features is described in more detail below With reference to FIG. 4, an exemplary adaptive taxonomy 400 of the invention is described. As used herein, taxonomy refers to a hierarchical structure of tags used to provide a method of organizing digital assets. Conceptually, a taxonomy can be thought of as a tree structure having a root node 410, a plurality branches 420 connecting leaf nodes 430. Each leaf node 430 can have further braches 420 that connect the leaf nodes 430 to sub-leaf nodes 440 and so on. As used with reference to the taxonomy 400, the terms node and tag are synonymously.

Each node 430 and sub-node 440 can be applied to a digital asset as a tag that is part of the meta-data for the digital asset. The tag that is used to identify and categorize the digital asset. When used properly, a taxonomy 400 not only helps an organization organize digital assets but the taxonomy also helps identify types of digital assets. Policies can also be associated with each node 430 and sub-node 440 of the taxonomy 400. Applying a node 430 or sub-node 440 as a tag of the taxonomy to a digital asset also associates the policy for that node to the digital asset. Examples of policies can include, but are not limited to, restricting access to a digital asset based on the role and/or identity of the end-user of the client 110, restricting replication actions based on the destination of the copy of the digital asset or the present location of the digital asset, and when the digital asset is removed from the client 110.

Although a taxonomy 400 is a powerful organizational tool, a rigid taxonomy restricts the flexibility of digital asset characterization. To that end, the invention provides a mechanism in which modifications to the taxonomy 400 can be made be the end-users of the clients 110 on an individual level without requiring modifications to the general taxonomy 400. Also, if a change to the general taxonomy 400 is required, the invention provides a mechanism for propagating the changes to the taxonomy 400 to the clients 110.

To accomplish these features, the invention provides the functionality to create an "alias" for a node 430 or sub-node 440 in the taxonomy. As used herein, an alias refers to an alternate name for the same tag in the taxonomy 400. For example, the term "CV" (Curriculum Vitae) is used in many parts of the world to have the same meaning as "resume" is used in the United States. In the taxonomy 400, a tag 440 is labeled "Resume" and has an alias 450 labeled "CV" associated with it. Essentially, the alias 450 points to the associated tag 440 and has the categorization and policy information as the tag 440. As will be described in more detail below, the alias 450 can be a local alias meaning that is available only to a specific client 110 or the alias can be a global alias meaning that the alias is available to all clients.

The invention includes functionality implemented, in one embodiment, by the server software 312 to promote an alias 450 to a tag 440. The promotion does not change how the alias 450 has been used previously. That is, digital assets that were tagged with the alias 450 are still governed by the same categorization and policy information of the alias 450. It should be understood that the transition from an alias to a tag 440 allows for the modification of the policies associated with the alias 450. Further details of the adaptive taxonomy 400 are provided below.

Figure 5B:
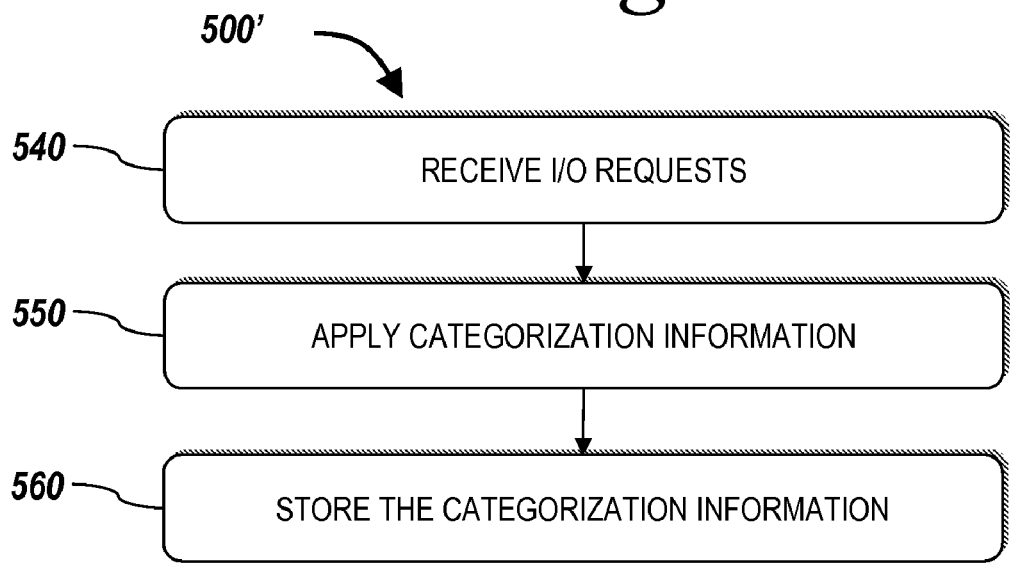
FIG. 5B shows an embodiment of a method of automatically categorizing digital assets.
Figure 5A:
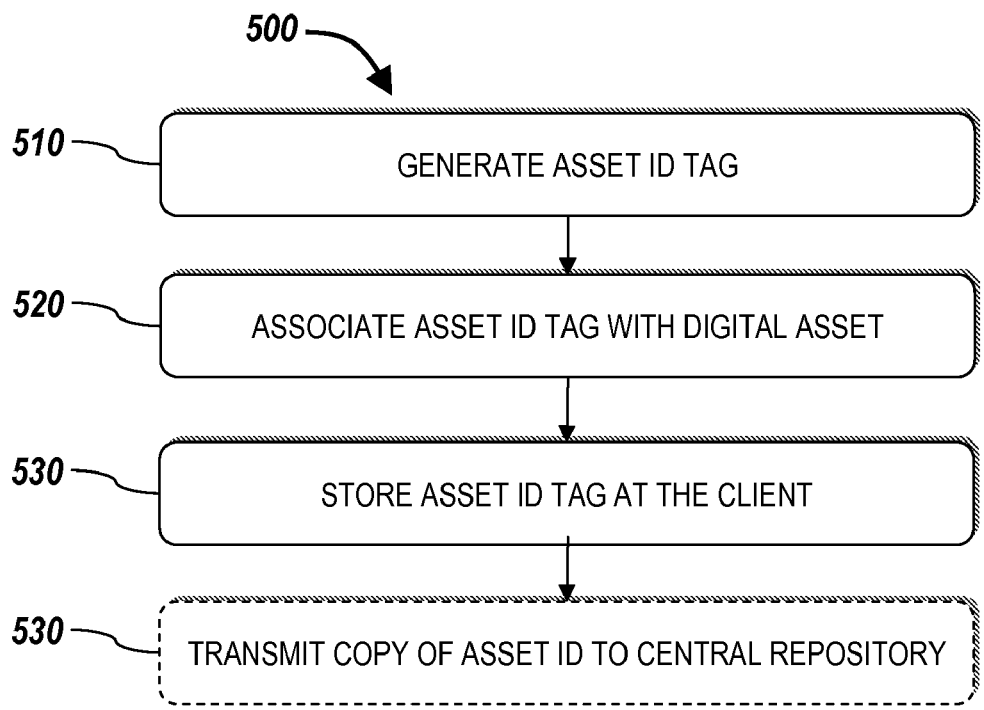
FIG. 5A shows a flow chart of an embodiment of a method of generating meta-data for a digital asset using the client software of FIG. 2 that is operating.

With reference to FIG. 5A, the method 500 for generating meta-data for a digital asset is shown and described. In one embodiment, a client 110 executing client software 212 generates a digital asset. The client software 212 intercepts a create or a save command for the digital asset and generates (step 510) an asset identification tag. The asset identification tag is the meta-data that is associated with the digital asset. Further, the client software 212 associates (step 520) the asset identification tag with the digital asset. The client stores (step 530) asset identification tag. Optionally, the asset identification tag is transmitted (step 540) to server 150 for storage in the central repository 336.

In one embodiment, generating an asset identification tag (step 510) is performed when the digital asset is stored at the client. In another embodiment, the asset identification tag is created when the end-user begins to create a new digital asset. For example, if the end-user of a client creates a new folder or directory for storing digital assets, the client software 212 examines any rules that related to the creation of the folder to categorize the new folder based first on the device on which the folder is being created, next based on the application creating the folder, and lastly the end-user creating the folder. However, if required, the end-user can be prompted to provide categorization information via an end-user interface. The categorization data is saved and the folder is created within the file system of the device. It should be understood that once a categorization data is applied to a digital asset, the categorization may be changed at a later time, if the associated rules allow. This allows for recategorization of certain digital assets while preventing recategorization of other digital assets. The terms rule and policy are used interchangeably throughout the specification.

In various embodiments, application rules define the set of categorized digital assets (e.g., taxonomy tags) that can be stored with a directory or file when that directory or file is created by an application. Application rules consider the name and context of the digital asset (binary name, binary versions, process name, window titles, and the link) and the name of the directory being created. From this data a set of taxonomy tags are determined and returned as the list of is tags for this digital asset.

Device rules define the set of taxonomy tags that can be applied to a directory or file when that directory or file is created by or stored on a particular device. Rules can be defined for device classes (e.g., local fixed device, network device, removable devices), individual storage devices or input devices. Similarly, end-user rules define the set of taxonomy tags that can be associated with a directory or file when that directory or file is created or changed by the end-user. User rules can consider the end-user's name, the end-user's role, the end-user's location or any other data that can be retrieved from a local or directory based end-user configuration.

By applying rules and categorizations to folders, directories, end-users, and devices, automatic and inheritance based categorization of digital assets is achieved. For example, if a word document is stored in a specific directory, the client software 212 applies the taxonomy tag indicated by the rules and categorization of the directory that stores the word document. Further, if a one or more uncategorized digital assets are moved into a categorized directory those digital asset inherent the categorization of the directory. Such a feature allows for the categorization of digital assets existing on the client 110 prior to the installation of the client software 212.

The following example is designed to illustrate one embodiment of categorizing a digital asset. The example should not be read to limit the scope the invention. Assume that an end-user John Smith who works the finance department creates an Excel file in the "C:\finance\john\budget" folder of his home directory that was categorized using the taxonomy tags 430 and 440. The client software 212 creates meta-data that contains various categorization information based on John's identity such as: data created, author, department, etc. The client software 212 can also add meta-data resulting from the rules associated with the "budget" folder (or its parent folder Finance) such as confidential, marked for compliance, do not delete, do not e-mail, and the like. The level of meta-data granularity can be further augmented with input from John using the graphical user interface if desired by John or required by the rules.

Figure 6:
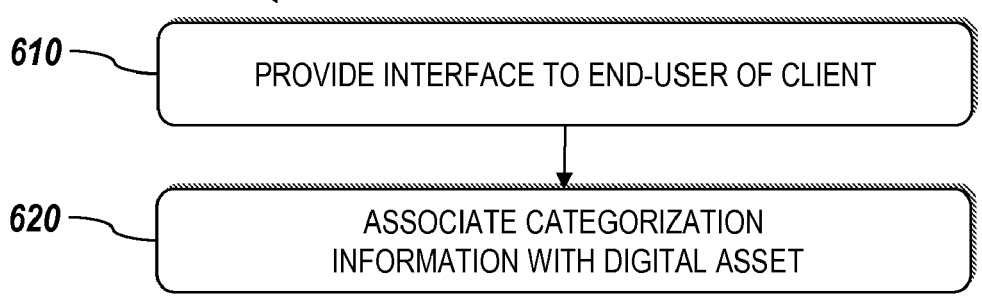
FIG. 6 shows an embodiment of a method of providing meta-data using a graphical user interface.

A method 600 of providing meta-data information using the graphical user interface is shown and described with reference to FIG. 6. The client software 212 provides (step 610) the end-user of the client 110 with a graphical display having one or more dialog boxes, lists, or radio buttons. The end-user manipulates the graphical user interface to provide meta-data that is associated (step 620) with the digital asset. Manipulation can include, but is not limited to, selecting a taxonomy tag 430 to apply to the digital and the like.

Figure 7:
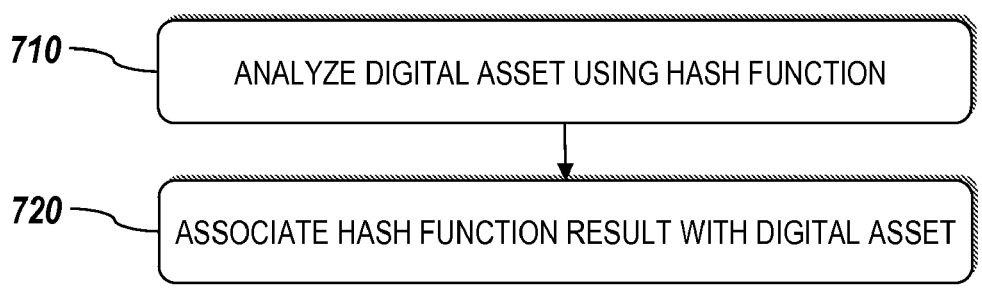
FIG. 7 shows an embodiment of a method of generating a digital identifier for a digital asset.

In addition to generating categorization information as part of the meta-data for a digital asset, the client software 212 can generate a digital identifier for each digital asset. One embodiment of a method 700 for generating such a digital identifier is shown and described with reference to FIG. 7. For example, during a save operation the client software 212 analyzes (step 710) the contents of the digital asset using a hash function. In one embodiment, the client software 212 analyzes the text of the digital asset. In other embodiment, additional or other elements of the digital asset are analyzed. For example, the categorization information can also be included in the analysis, or in the case of an e-mail or instant message the sender and recipient of the e-mail or instant message. Examples of hash function that can be used by the client software 212 include but are not limited to MD5 (IETF RFC1321) and SHA1 (IETF RFC3174).

Also, the meta-data can include a list of keywords that are a part of the digital asset. One method of generating the list of keywords for the digital asset is to analyze the digital asset and record words of importance. It should be understood that certain words will not be recognized as keywords. For examples, articles such "a", "an", and "the", or pronouns, will not be recorded as keywords. Various known techniques can be used to generate the list of keywords for the digital asset.

The combination of the digital identifier, keywords, and the categorization information described above, or respective combinations of portions of each create the asset identification tag (i.e., meta-data) for the digital asset. As previously stated, the asset identification tag is associated (step 520) with the digital asset. Association can include creating a "hidden" file that stores the meta-data that is permanently linked to the digital asset. As used herein, permanently linked refers to an association that can not be removed regardless of the transmission, moving, or copying of the digital asset. For example, if a digital asset is e-mailed to another end-user the associated asset identification tag is e-mailed as well. The propagation of an asset identification tag will be described in more detail below.

In one embodiment, storing (step 530) the asset identification tag includes storing the asset identification tag in the persistent storage 216 of the client 216. The asset identification tag can be stored in the same shared storage area as the digital asset. Alternatively, the asset identification tag is stored separate from the digital asset. For example, in a different dedicated memory location or another storage device.

In order to determine whether to transmit (step 530) a copy of the asset identification to the server 150, the meta-data of the digital asset is resolved to one of three levels: (1) unmanaged; (2) managed; or (3) records managed. In one embodiment, if the digital asset is resolved to be unmanaged then the asset identification tag is not stored by the client 110 or the server 150. However, if the asset identification tag is resolved to be managed then the asset identification tag is stored locally at the client 110. Finally, if the asset identification tag is resolved as records managed a copy of the asset identification tag is transmitted to the server 150 to notify the server software 312 of the existence of the digital asset. It should be noted that actually the digital asset is not transmitted to the server 150, but instead the digital asset is stored locally at the client 110. Although described as having three levels of resolution, it should be understood that a fewer number or greater number of levels are possible.

The advantages of having a class of "managed" digital assets and a class of "records managed" digital asset is to treat the digital assets in the manner similar to the other assets of a corporations. For example, look at the difference between pencils and computers in a corporation. As with any asset in a corporation, pencils need to be managed. In the case of pencils, the corporation likes to know how many have been ordered and have a general idea of when to order additional pencils. The corporation is typically not concerned with who has a pencil or how many pencils are owned by each person. In contrast to pencils, the corporation wants to know exactly which end-user has each computer and where the computer is located. This analogy translates directly to digital asset. For example, "managed" digital asset can be mapped to pencils and "records managed" digital assets can be mapped to computers. An example of a managed digital asset can be a voice mail from potential new client. An example of a records managed digital asset can be an invention disclosure. By using a leveled approach to digital asset classification, the centralized repository needs only to track a percentage of the digital assets in the distributed computing environment 100 instead of all the digital assets. The digital assets that are not tracked by the centralized repository are tracked by the clients 110. As previously explained, the clients 110 track each of the assets that are stored locally at the client.

One way to determine which digital assets are unmanaged, managed, or records managed is to use the taxonomy tags 430. As previously stated, each digital asset is associated with at least one tag 430 of the taxonomy 400. The taxonomy tag includes policy information (e.g., rules) and a digital asset classification level. Other meta-data entries can also be used to determine whether a digital asset is unmanaged, managed, or records managed. For example, the creation date of the digital asset can be used.

In one embodiment, any digital asset that exists on a client 110 when the client software 212 is installed is automatically categorized as unmanaged. As a result, no meta-data entry on the client is created for these digital assets. The taxonomy 400 can include a tag 430 in it that is labeled "unmanaged" that includes associated policies that are applied to unmanaged digital assets. Typically a small set of policies is used. For example, an expiration date (i.e., expire the asset in 1 year) and also a location control policy that does not allow the digital to be moved, copied, e-mailed, or otherwise transferred from the current client 110. Similarly, every other tag 430 of the taxonomy 400 can include a rule that creates a meta-data entry giving the digital asset a level of either managed or records managed. For example, if a digital asset is associated with the IP tag 430 the meta-data for the digital asset indicates that the digital asset is classified as managed. Further, if the digital asset is associated with the disclosure sub-tag 440 the meta-data for the digital asset indicates that the digital asset is records managed and a copy of the meta-data is transferred to the server 150 for storage.

In addition to a digital identifier and categorization information, the meta-data for a digital asset can include a list of operations performed on the digital asset by the client 110. This information can be thought of as an audit history and is useful for many things. For example, determining the number of copies of a digital asset that exists, which end-user created the copies, what application created the copies, what is the source of the copy of the digital asset, and which devices stored the copies. The resulting copy not only includes all the contents of the original digital asset, but also the meta-data for the original digital asset, which include the digital identifier of the original file. Said another way, when a copy operation is performed both the contents of the digital asset and its associated meta-data are copied.

It should be understood that the audit information for the same digital asset existing on the different clients 110 can have different contents. If the digital asset is records managed, the audit information for each asset is transferred to the server 150 as part of the meta-data for the asset. The server software 312 performs a union of the audit information, propagates the unionized audit information to the clients 110, and instructions the client software 212 to remove the local copy of the pre-unionized meta-data and replace the pre-unionized meta-data with the unionized meta-data.

Various methods for copying various digital assets are known. Methods for files and e-mail, both of which digital assets, are described below. The most straight forward way to create a copy of a digital asset is to print the digital asset onto paper. This creates a "hard copy" of the digital asset. It is important to track the printing of digital assets for a number of reasons. One reasons is for expiration purposes. It is desirable to know that if a digital asset was printed on the day of its expiration so that the paper copy was also destroyed. Another reason for tracking copies of digital assets, is to monitor which end-users are accessing and copying which digital assets.

Also, there are many different ways that an electronic copy of a file can be created by the end-user of the client 110. For example, the end-user can execute the "copy" command in windows explorer and then execute a "paste" command in another location. This causes a copy of the content of the file to be created. Even though there are many methods to create a copy of a file, the actual create of the new copy must go through the file system of the client 110. As a result, filter driver 254 is used to identify when a new file for the file system is created.

It is also important to determine when an open file of the file system is written to. For example, an application might open a first file "A" for reading and a second file "B" for writing. The application under the instruction of the end-user copies the contents of the first file A to the second file B. In this example, the second file B was not created it was only updated with the contents of the first file A. In another embodiment, file B is created as a new file and the contents of file A are copied into file B.

Similar to files, there exists a number of methods that can be employed to create a copy of an e-mail. The simplest method is to "copy" an e-mail and then "paste" it using the functionality provided by the e-mail application of the client 110.

Another way to create a copy of an e-mail is to copy the folder or the e-mail application file that stores the e-mail or e-mails for the e-mail application. Within an e-mail application, an e-mail can be stored within a "folder" of the e-mail application to provide a means to organize the end-user's e-mail. The folders and e-mails that are displayed to the end-user of the e-mail application are stored in files or directories of the client 110, which may be file system folder. Using MICROSOFT OFFICE OUTLOOK as an example, the application creates and uses the .OST and .PST files for holding the definitions of the folders and the e-mails shown to the end-user of the application. One method the end-user can use to create a copy of e-mail is to export the e-mail out of the e-mail application. Outlook provides an interface that allows one to export information. Using this feature, one can put the e-mail into a text file, excel spreadsheet or even a .PST file thereby creating a copy of the e-mail.

Another method of creating a copy of e-mail is to simply copy the .OST and/or the .PST file outside of the e-mail application. In this case, the e-mail application is not necessarily executing on the client 110 during the copy operations. This operation is similar to the copying of a file from the file system as described above.

With reference to FIG. 5B, an embodiment of a method 500' of categorizing digital assets is shown and described. In one embodiment, the method 500' includes receiving (step 540) an I/O request related to a digital asset, applying (step 550) categorization information to the digital asset without intervention by the end-user of the client, and storing (step 560) the categorization information as part of the digital asset identification tag.

The agent 250' receives the filtered I/O from the mini-filter 259 as previously described. In other embodiments, the agent 250' receives the I/O from a module other than the mini-filter 259.

The agent 250' applies (step 550) at least categorization information to the filtered I/O, without intervention by the end-user of the client 110'. Said another way, the agent 250' automatically applies categorization information to the I/O request. One example of automatic categorization includes inheriting categorization information. Assume the I/O request is to recreate a new document and store it in an folder. The agent 250' applies the categorization information assigned to that folder. The agent 250' can also evaluate another hierarchical rule set specific to the agent 250' in a manner similar to that described above with reference to the mini-filter 259. Again, conflicts in the hierarchy of rules can be resolved in favor of either a higher numbered conflict or a lower numbered conflict.

The applied categorization information is stored (step 560) as part of the digital asset identification tag created for the digital asset. If a tag already exists for the digital asset, the categorization information supplements the existing data. In one embodiment, the categorization information is stored locally at the client 110'. In another embodiment, a copy of the categorization information is stored remotely from the digital asset. Examples include storing the categorization information in a database, file server, remote server, or some other storage device.

Figure 8:
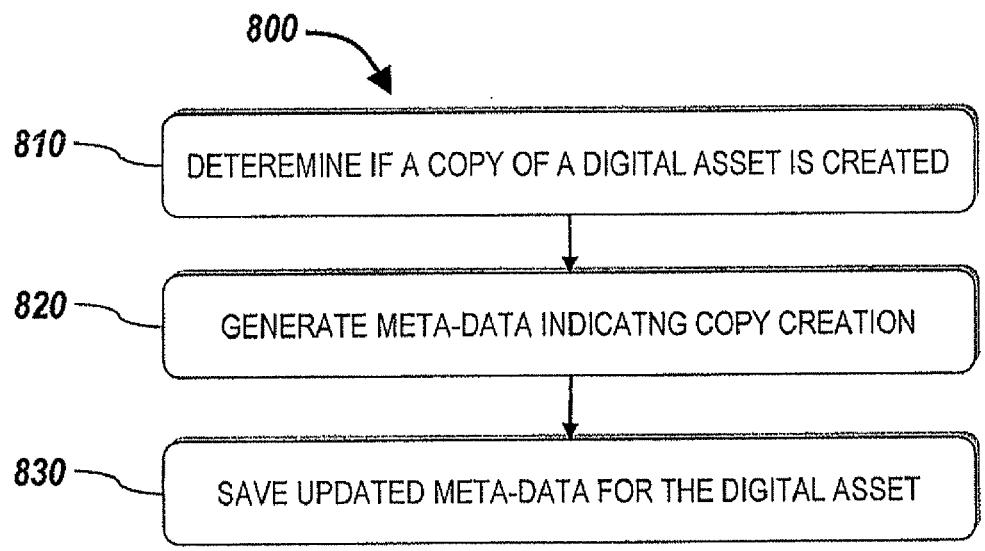
FIG. 8 shows an embodiment of a method of tracking copies of a digital asset.

With respect to FIG. 8, a method 800 of tracking a copy of a digital asset in the distributed computing environment is shown and described. In one embodiment, the method includes determining (step 810) if a copy of the digital asset is created, generating (step 820) a meta-data entry for the original digital asset that indicates a copy was made, and updating (step 830) the stored meta-data for the digital asset.

The determining (step 810) can be accomplished in many ways. In one embodiment, the meta-data of the digital asset being created is compared to a list of know meta-data stored on the client 110 or server 150. In another embodiment, only a portion of the meta-data is used to do the comparison (e.g., the digital identifier).

In another embodiment, the filter driver 254 or the plug-in 258 monitors the action of the applications executing on the client with respect to file I/O. By monitoring an application and its threads, the client software 212 can determine what files are being opened for reading and what files are being open for writing. For example, if an application has opened file A and file B for input and file C for output. File C inherits, as previously described, all the meta-data (e.g., control policies and the like) from both file A and file B and associates them with file C. This method addresses the case of either creating file C as a new file or opening an existing file C for write. Once the first I/O is completed to the output, the meta-data will be updated to the union of file A and file B as described in more detail below. Further, if file C is stored in a folder having an applied taxonomy tag 430, resulting meta-data is the union of file A, file B, and the folder.

The generation (step 820) of meta-data can be accomplished in various ways. For example, when a print (from the perspective of the client software 212 is essentially creating a paper copy of the digital asset) is executed meta-data about the print is add to the meta-data of the printed digital asset. This meta-data can include various combinations of the date and time the digital asset was printed, which end-user printed the digital asset, which digital assets were the source of the printed digital asset, the digital identifier from the source digital assets, and what printer generated the paper copy of the digital asset.

Also, various methods of updating (step 830) the meta-data for the digital asset can be used. For example, in the case of a managed digital asset the meta-data previously stored about the digital asset is refreshed with the copy meta-data. In the case of a records managed digital asset, after the locally stored meta-data is updated the updated meta-data is transmitted to the server 150 for storage.

In certain instances, it is desirable to suspend the creation of meta-data for a digital asset. For example, during the installation of other software applications. Typically, when installing software, a program is executing commands that will cause folders to be created. The end-user could be bombarded with requests for categorization of folders. Because of this, there is a special command that can be executed by the end-user of the client 110 that informs the client software 212 to suspend its operation. After the installation of the software, the client software 212 resumes its normal operation. Although the operation of the client software 212 can be suspended, the invention monitors what operations are performed while the client software 212 is suspend and records this information to a general audit log for the client 110.

After creating meta-data for each of the digital assets, the meta-data can be used to provide various features of the invention. Some of these features are provided by the client software 212, some are provided by the server software 312, and some are provided by the cooperation of the client software 212 and server software 312.

One feature provided by the client software 212 is the ability to locate a digital asset using the keywords and meta-data associated with the digital asset. As used herein, the term locate is used synonymously with the term search. Because each client 110 stores their digital assets locally, the possible solution set to a locate request is a closed set of digital assets. In essence, when a locate command is executed the full set of possible keywords and meta-data tags that could be used in locate are shown to the end-user of the client 110 as a set of virtualized folders. This removes the requirement from the end-user to input a search term in a search engine if the end-user can not think of a search term. Because most end-users work in a focused area, the number of taxonomy tags and the number of unique keywords stored in the meta-data of the digital assets words are typically limited to the end-users focused work area.

Figure 9A:
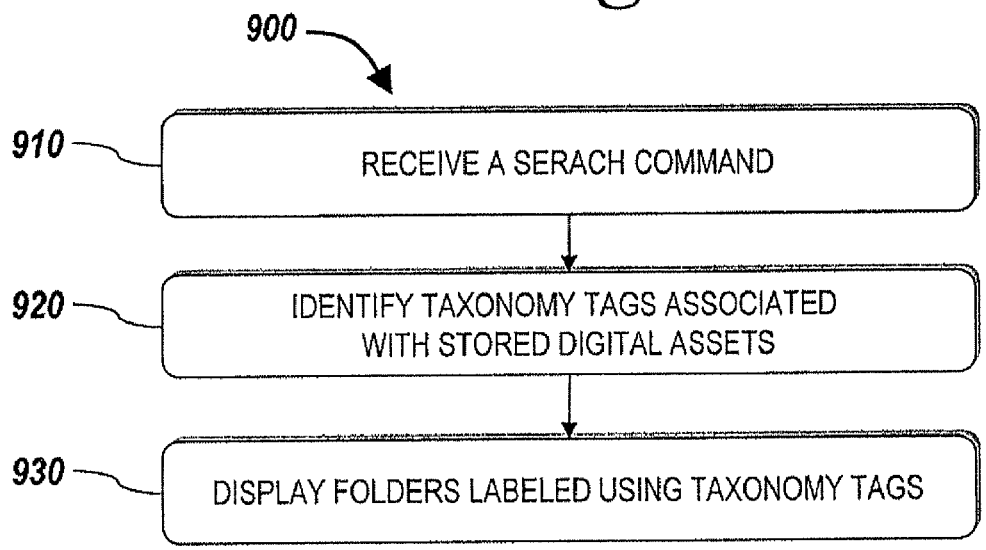
FIG. 9A shows an embodiment of a method of locating a digital asset in the distributed computing environment.

With reference to FIG. 9A, a method of locating a digital asset in the distributed computing environment 100 is shown and described. In one embodiment, the method includes receiving (step 910) a search command from the end-user of the client, identifying (step 920) the taxonomy tags 430 associated with the digital assets that are stored locally at the client, and displaying (step 930) one or more folders to the end-user of the client 110. The folders include labels that are the identified taxonomy tags 430.

Receiving (step 910) a search or locate command from the end-user of a client 110 can be accomplished in various ways. For example, the end-user can select a hot key (e.g., F12) on a keyword. In another embodiment, the end-user can select a portion of a digital asset and right-click on the selected portion. As a result, a menu is displayed to the end-user that includes a locate menu item. Additionally, the end-user can select a search command from a start menu option.

Various means of identifying (step 920) the taxonomy tags 430 associated with the digital assets of the client 110 are contemplated. In one embodiment, a scan is performed of all the digital assets stored at the client 110 to determine which taxonomy tags 430 are associated with the digital assets. In another embodiment, the end-user can supply a search term to the locate function. As a result, the identified digital assets include the provided term in their associated meta-data. Alternatively, the provided term is used to exclude taxonomy tags 430. In addition to identifying taxonomy tags 430, the client software 212 can identify the keywords in the associated meta-data for the digital assets. Also, a combination of taxonomy tags 430 and keywords can be used.

Figure 10:
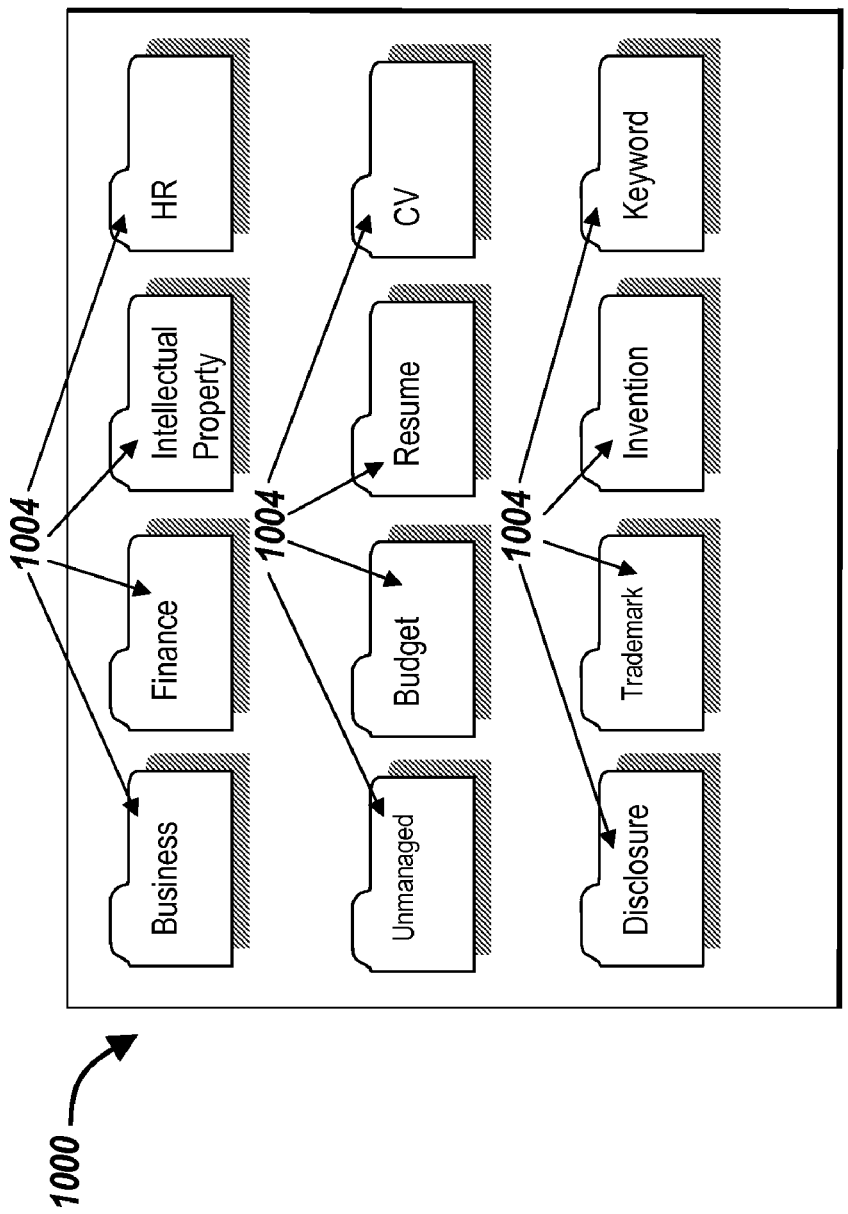
FIG. 10 shows an embodiment of a graphical display of a locate result constructed.

Once the taxonomy tags 430 and/or keywords are identifies, the client software 212 generates a virtualized file system view of the associated digital assets and displays (step 930) to the end-user. In one embodiment, the familiar graphical "explorer" interface is shown to the end-user. With reference to FIG. 10, the explorer view 1000 depicts one or more folders 1004 and/or files to the end-user. The virtual folders 1004 include a label that is one of the identified taxonomy tags 403 or keywords. The virtual folders 1004 are not the actual file system folders. Creation of the virtual folders is accomplished by the client software 212.

Selecting one of the virtual folders 1004 results in another display of another set of virtual folders. In essence, the system provides a means to "drill down" into meta-data of the digital assets to locate a desired digital asset. By selecting a displayed virtual folder, the client software 212 is in essence performing another search using only the set of digital assets selected from the first search.

In addition to providing search functionality the client software 212 provides functionality to display the digital assets according to a user defined organizational semantic. Used in combination with virtual folders, the users can create on-the-fly organizations of the digital assets. Conceptually, the digital assets are initially grouped as a single large pool of files having the previously described meta-data. The user then describes an organization and the pool of assets is displayed immediately in that organization. Said another way, the files are displayed without reference to any pre-existing organization hierarchy (e.g., file system) of the distributed computing environment.

As a summary, the end-user of a client 110 defines one or more hierarchies, which are also referred to as organization semantics through the specification. Once this hierarchy is described, it is named and can be shared with other clients 110. When executed, the digital assets are organized and displayed to the user in File Explorer (e.g., for a Windows operating system) as if the digital assets were stored and organized in that manner. More than one organizational semantic can be displayed at a time.

In one embodiment, a display engine 257 is included as part of the client software 212' of FIG. 2B. Also, the display engine 212 can be included on the server 150. In one embodiment, the display engine 257 is integrated into the file explorer or any other similar application. The display engine 257 extracts the meta-data of the digital assets is required by the defined by the organization semantic. In response, the display engine 257 populates a virtual disk (e.g., d:\) with the appropriate virtual folders. In response to the selection of a virtual folder that is displayed to the end-user, the display engine 257, alone or in combination with other modules of the client software 212, evaluates whether to display another virtual folder or the digital assets within the folder.

Figure 9B:
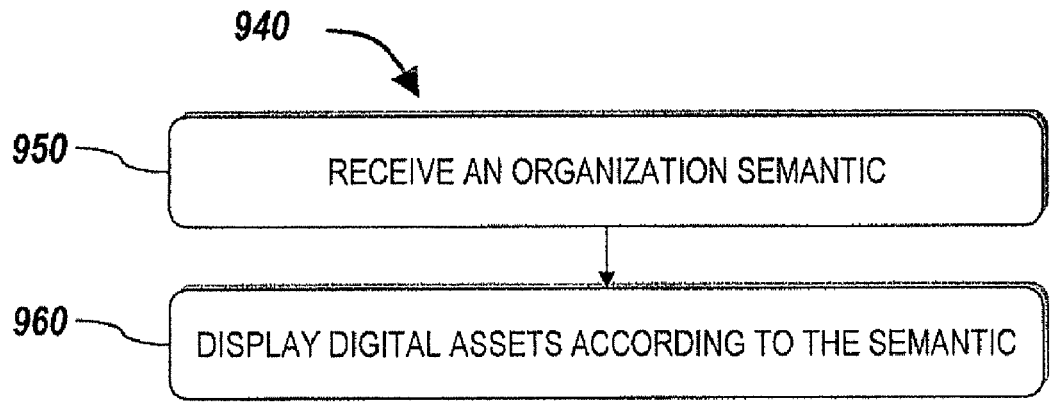
FIG. 9B shows an embodiment of a method of displaying digital assets of the distributed computing environment.

With reference to FIG. 9B, a method 940 of displaying digital assets of the distributed computing environment 100 according to an organization semantic specified by an end-user of the client 110 is shown and described. In one embodiment, the method 940 includes receiving (step 950) an organization semantic from the end-user of the client 110 and displaying (step 960) the digital assets to the end-user according to the received semantic.

In one embodiment, the display engine 257 receives (step 950) the organization semantic through a graphical user interface displayed to the end-user. The organization semantic has one or more depth levels and specifies one or more attributes of a digital asset identification tag.

In one embodiment, the display engine displays (step 960) the digital assets that correspond to the organization semantic to the end-user as if they were on a "virtual computing" element. For example, the digital assets are shown as the contents of a virtual disk. The digital assets include pointers to the actual storage location of the digital asset within the distributed computing environment 100.

An example of an organization semantic includes three levels. The first level can be alphabetical (based on filename), the second level can be Date of modification and the third level is client name. Although described as having three levels, an organization semantic can have more or less than three levels. When specifying alphabetical, the end-user could specify how many letters per folder. When specifying date, the end-user could specify the size of the date range per folder. With this specified, the File Explorer would in this example have twenty-six folders at the top level—one for each letter. If the end-user changes the focus (e.g., by double-clicking on the virtual folders) to one of those folders, the end-user then sees a folder for each date range specified. If the end-user further changes the focus to one of the date range folders, the end-user sees a folder for each client name. Changing the focus into one of the client name folders reveals the set of files that matches the full path on how the end-user reached the destination.

As described in the example, the complete set of digital assets has a new organization. This can be thought of as displaying the existing digital assets on a virtual computing device (e.g., a hard drive d:\ or some other computing device) without reference to how the digital assets are actually stored. It is also important to note that the new organization uses information from the total pool of available digital assets. This does not mean that a given organization will always include all the digital assets. In the example above, the final folder requires the digital asset to have a client name associated therewith. If a specific digital asset does not have a client name associated, that digital asset is not represented in the organization. In some embodiments, the end-user specifies that a default virtual folder be created for any digital assets that do not fall into other virtual folders. In that case, all information assets will be represented with ones that don't have a client tag all being viewed from the Default folder for that level.

As an end-user creates a new organization by defining the depth and the characteristics for each level, the end-user specifies attributes for a given level. For example, if the digital assets are organized by date then the attribute is the date range for each folder. The combinations of the level and attribute are combined into a numeric value. For example, each level has a corresponding value such as 1, 2, 3, and the attribute is converted into a variable length field. When all of these pairs are combined, a final arbitrarily large number, converted into hex, is presented to the user as an identifier representing the current organization semantic. This allows the end-user to save the different views and quickly get the view back. It also allows the end-user to share the view with another end-user.

In one embodiment, the hierarchy of virtual folders is displayed to the user in a design palette. The palette can be visible and subsequently hidden from view at the choice of the end-user. The end-user can modify the palette in real-time and see the results of the new organization in the display. Another feature provided by the client software 212 is the ability to update the displayed organization in real-time. For example, if a digital asset is added by any component of the distributed computing environment, the newly created digital asset is placed and displayed within the correct virtual folder of the organization semantic.

As previously discussed, digital assets also include e-mails. In one embodiment, for the purposes of displaying the e-mails as part of an end-user defined organization semantic, each e-mail is treated as a file. In one embodiment, the name of the file is created from the subject line of the e-mail.

In the case of multiple e-mails having the same subject line, an optional "number" or other alpha-numeric identifier is added to the file name.

Another simple example of organization e-mail based digital assets includes defining an organization semantic having a single level hierarchy. The single level has the attribute that requires the contents of the virtual folder to be limited to only e-mail digital assets. Using such an organization semantic results in the display of a file entry for each e-mail in the inbox of the end-user. Again, as additional e-mails are received by the end-user the client software 212 updates the organization and displays the new e-mails to the end-user.

In one embodiment, the end-user defines an organization semantic through a graphical user interface that is shown to the end-user. The following describes an example of the steps of creating an organization semantic. Initially, the end-user launches the file explorer or Windows explorer and selects a toolbar option. In response, the end-user is shown a palette that displays any previously defined and saved organizations created by the end-user or received from other end-users. If the end-user chooses to define a new organization semantic, they are requested to define the characteristics and attributes of the first level. Next, the end-user can define any further number of levels of the organization semantic. Once defined, the organization semantic is communicated to the display engine for processing.

Another feature enabled by the meta-data and client software 212 of the present invention is the ability to control and maintain a document expiration policy. By using the associated expiration date that is present in the meta-data for the digital asset, different sets of digital assets can be exposed to an archive system and recorded to separate mediums. For example, all digital assets and only the digital assets having an expiration date in the range of a given week are exposed to the archive system. At the end of that indicated week, the archive tape can be destroyed, thereby destroying the backed-up copies of the digital assets.

Figure 11:
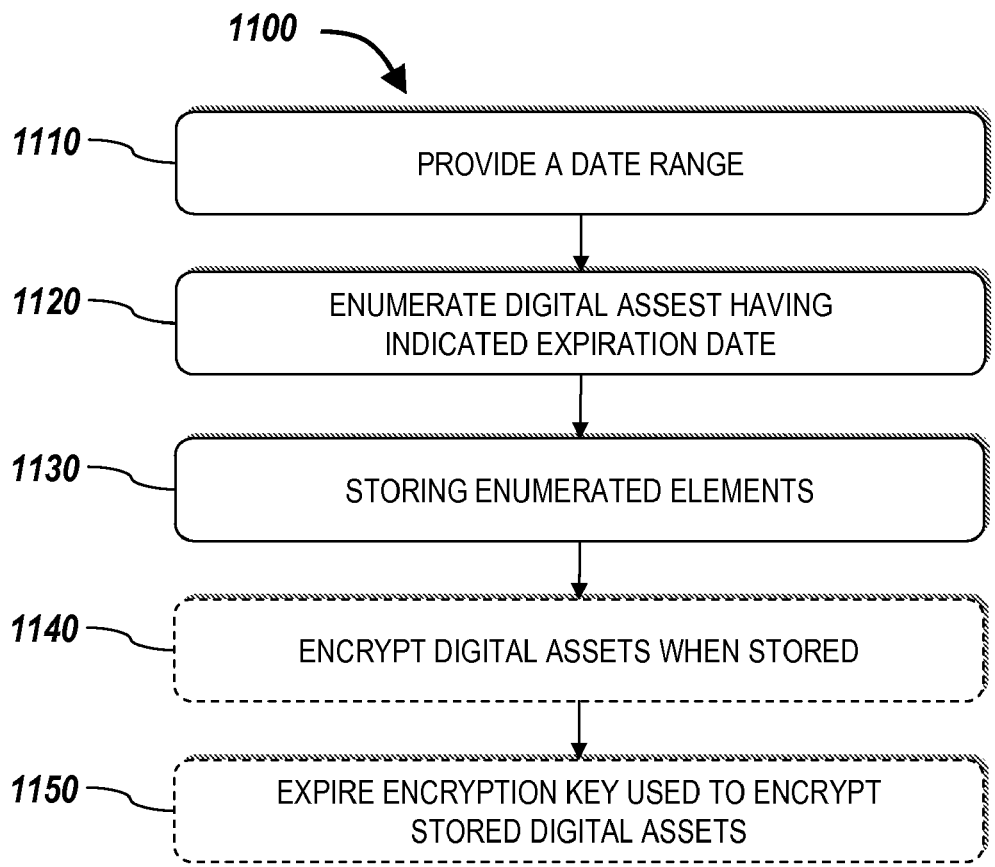
FIG. 11 shows an embodiment of a method of expiring a digital asset.

One embodiment of a method 1100 of expiring stored digital assets is shown and described with reference to FIG. 11. The method includes providing (step 1110) a date range using the client software 212, enumerating (step 1120) the digital assets that have an expiration date within the provide range as file system elements, and storing (step 1130) the enumerate assets on a storage medium.

The end-user provides (step 1100) a date range to the client software 212 using a graphical user interface or a command line entry. In another embodiment, the client 110 includes one or more archive scripts that are executed automatically. The scripts include date ranges used to expose specific digital assets to the archive system. Although described as storing the digital assets having the associated date range, it should be understood that the provided data range can indicate digital assets that are not be exposed. An indicator or flag (e.g., an exclamation point) can be used to indicate the described "not" function. Also combinations of both types of date ranges can be used to generate the desired set of digital assets. In addition, the meta-data associated with the digital assets can be used to define the set of digital assets that are exposed for archiving.

Using the provided data range, the digital assets are separated using a virtual file system. In one embodiment, the filter driver 254 creates a virtual file system enumerating (step 1120) those digital assets having an expiration date within the provided date range. Conceptually, the virtual file system acts as a mask over the actual file system of the client. The mask exposes only those digital assets fulfilling the indicated criteria to the archive system.

The exposed digital assets are copied (step 1130) to a storage medium. The storage medium can be a tape, disk, or other suitable storage medium. In one embodiment, the digital assets that are copied to the storage medium are encrypted prior to be copied to the storage medium. In another embodiment, when an expiration date is assigned to the meta-data of the digital asset the digital asset is encrypted (step 1140) when the digital asset is stored in the file system of the client 110. Digital assets having similar expiration dates can each be encrypted with the same encryption key, which can also be stored on the storage medium or separate from the storage medium. If there is a mix of different sets of assets on the medium, the key will be stored separately from the medium. The encryption key is assigned an expiration date. After the expiration of that date, the encryption key is destroyed (step 1150). In another embodiment, a separate encryption key is used to encrypt each digital asset.

There are many methods that can be used encrypted the digital assets. For example, an application can encrypt the digital assets. Alternatively, each client can have an encrypted file system such as the Microsoft Encrypted File System. In another embodiment, the filter driver 254 or plug-in 258 can perform the encryption Another feature enabled by the meta-data and client software 212 of the present invention and in some embodiments the server software 312 is the prevention of the restoration of a previously expired digital asset. In one embodiment, once a digital asset has been expired the actual digital asset is removed from the client 110. However, the meta-data remains at the client 110 and in the case of a record managed digital asset at the server 150. The meta-data can include an entry that the digital asset has been previously expired.

Figure 12:
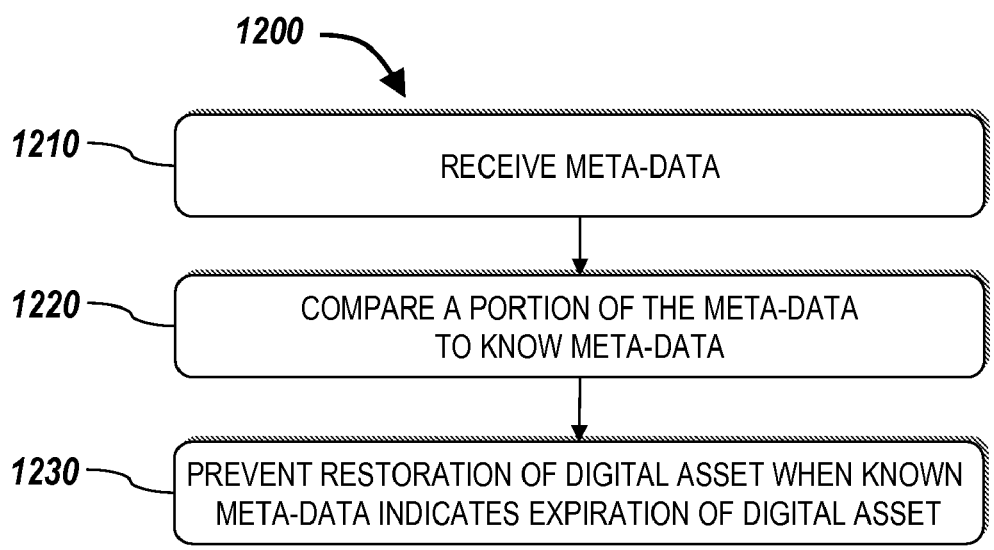
FIG. 12 shows an embodiment of a method of preventing the restoration of an expired digital asset.

With reference to FIG. 12, a method 1200 for prevention of the restoration of a digital asset is shown and described. In one embodiment, the method includes receiving (step 1210) meta-data associated with a digital asset that was previously created by a client 110, comparing (step 1220) the received meta-data with the stored meta-data on the client 110 and/or the server 150, and preventing (step 1230) the restoration of the digital asset when the received meta-data matches stored meta-data for the digital asset that indicates the digital asset was previously expired.

As previously explained, the client 110 and the server 150 need not be in constant communication because the digital assets are not stored at the server 150, and further a full copy of the meta-data is stored at the client 110. When a digital asset is restored to a client 110 that did not create the digital asset and thus does not have a meta-data entry to compare the restored asset to, the client 110 establishes a connection to the server 150. Once the connection is established, the client 110 transmits the meta-data to the server 150 where it is compared (step 1220) against the meta-stored stored at the server 150.

In one embodiment, the comparing step (1220) includes comparing the entire meta-data contents with the list of known meta-data. In another embodiment, a portion of the meta-data is compared to the list of known meta-data. The portion of the meta-data can include, but is not limited to, the digital identifier or a taxonomy tag. During the comparison process, the client 110 can disconnect from the server 150 or maintain the communication link 120 with the server 150.

When the server 150 finds a match between the restored digital asset meta-data and previously expired digital asset meta-data, the server 150 issues a command to prevent (step 1230) the restoration of the digital asset to the client 110. In one embodiment, the command includes instructions to remove the restore digital asset. In another embodiment, the command includes instruction to not allow the digital asset to be copied to the file system of the client 110.

Another function provided by the client software 212 of the present invention is the ability to control access to digital assets using the associated meta-data of the digital assets. Using the meta-data that is associated with each digital asset, role based, user based, and a combination of role based and user based access is provided.

Figure 13:
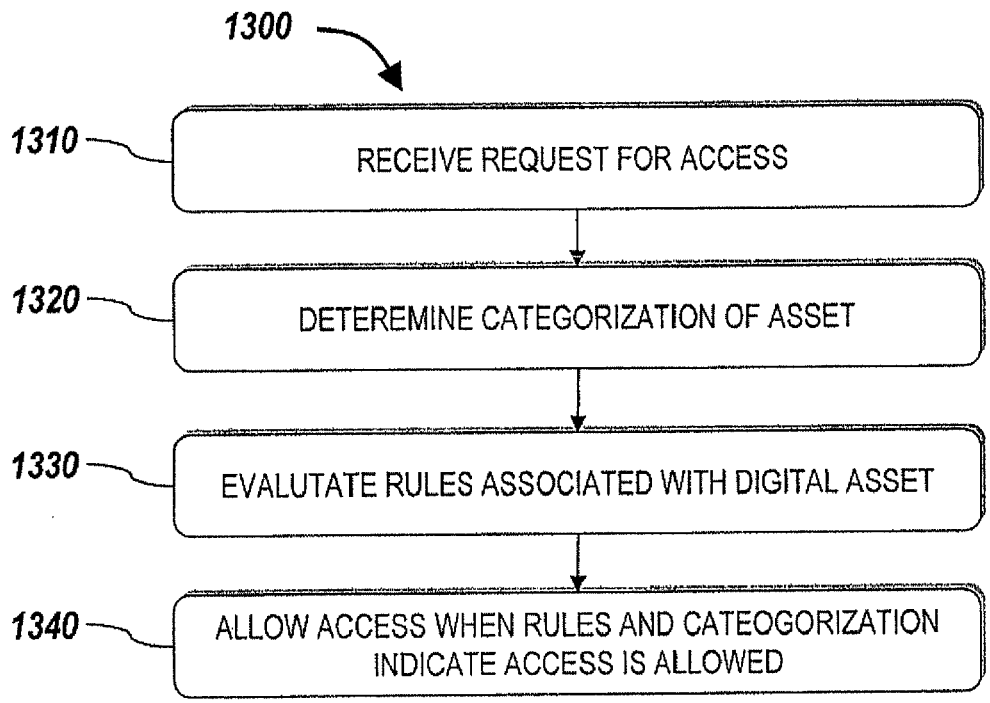
FIG. 13 shows an embodiment of a method of performing categorization based access to a digital asset.

One embodiment of a method of providing meta-data based access to a digital asset is shown and described with reference to FIG. 13. The method includes receiving (step 1310) a request to access the digital asset, determining (step 1320) a categorization of the digital asset, evaluating (step 1330) any rules associated with the categorization, and allowing (step 1340) access to the digital asset when the determining and evaluating indicate access is allowed.

In one embodiment, the receiving (step 1310) includes intercepting, by the filter driver 254 or plug-in 258, a file system access request. The file system access request can include, but is not limited to, a copy request, an open request, a move request, a delete request, and the like.

The filter driver 254 or plug-in 258 analyzes the meta-data associated with the digital asset. The analysis includes, processing the meta-data to determine (step 1320) which taxonomy tags 430 are associated with the digital asset. The analysis also includes evaluating (step 1330) the rules that are associated with the applied taxonomy tags 430. For example, if a digital asset was tagged as Finance and Budget, the associated rules can be to restrict access to only all the executives and John, who is a consultant, when he is accessing the digital asset from a computer located at the offices of the corporation. The filter driver 254 intercepts the file system request for access and ensures that that each of the conditions is satisfied. If each of the conditions is satisfied, the requested access is allowed (step 1340). Although described from the perspective of the client 110, it should be understood the server 150 can also perform the described method.

It is also desirable to prevent unauthorized access to digital assets by trying to circumvent the rules and categorizations associated with the digital assets. To that end, the invention propagates the meta-data with the digital asset. For example, if a digital asset is attached to an e-mail the meta-data is also attached to the e-mail. Similarly, if a digital asset is copied to a storage device, the meta-data associated with the digital asset is copied as well.

Figure 14B:
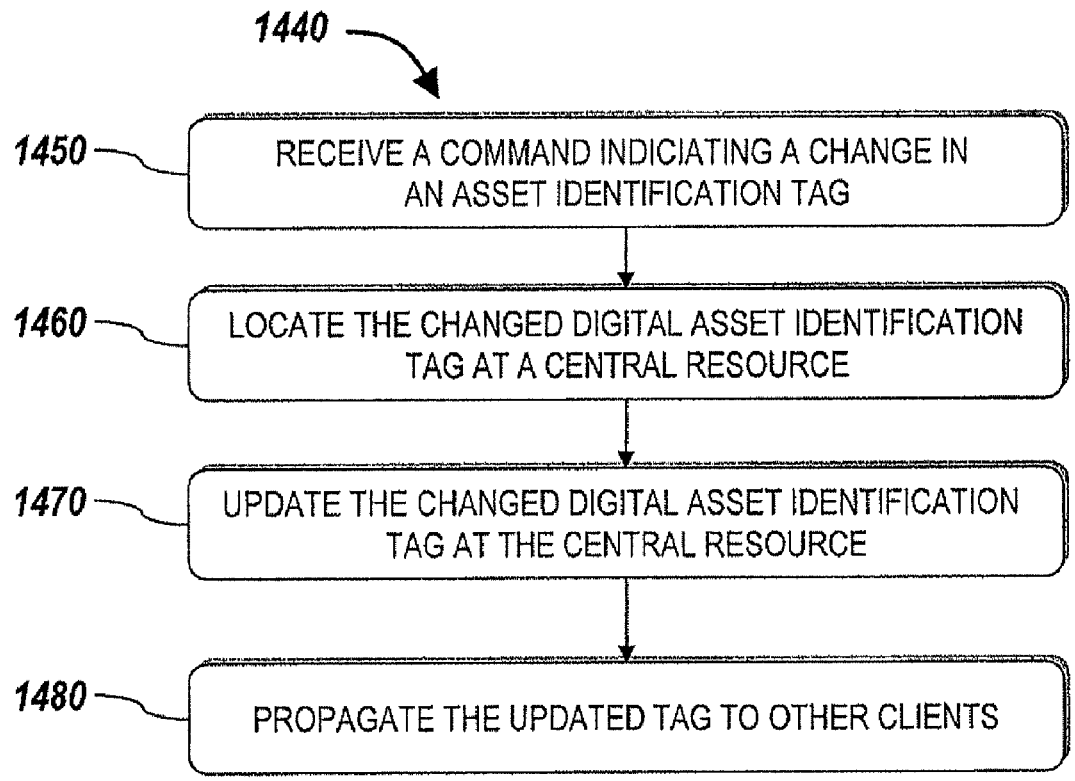
FIG. 14B shows an embodiment of a method of propagating the meta-data throughout the distributed computing environment.
Figure 14A:
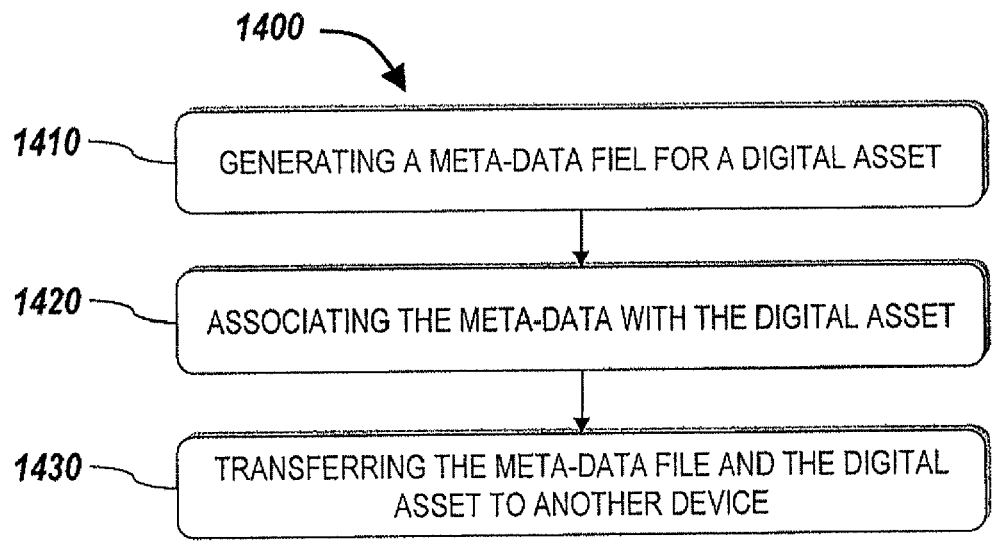
FIG. 14A shows an embodiment of a method of propagating the meta-data with a digital asset.

FIG. 14A depicts an embodiment of a method of propagating the meta-data with a digital asset. The method includes generating (step 1410) a meta-data set for a digital asset, associating (step 1420) the meta-data set with the digital asset, and transferring (step 1430) the meta-data set with the digital asset.

The various methods of generating a meta-data set for a digital asset have been described above and will not be repeated here. The meta-data set can have characteristics of the digital asset. For example, if the digital asset is a Word file, the meta-data set can have certain properties of a Word file as well. In one embodiment, the meta-data set is a hidden file.

The associated meta-data set is transferred (step 1430) with the digital asset. Transferring can include, but is not limited to, copying, renaming, deleting, moving, e-mailing, and the like. In the case a digital asset is transferred as an attachment to an e-mail, the meta-data can be transferred using certain aspects of the e-mail. It is known, when an e-mail is transmitted to a recipient the e-mail format is defined by standards from the IETF such as RFC 822 or the newer RFC 2822, the entire contents of which are herein incorporated by reference. These standards provide for fields in the e-mail header such as comments, keywords and an optional-field. The meta-data can be placed into these fields using the plug-in 258 of the client software 212 or by a network filter driver 254 (not shown) that is located in the network driver stack of the client 110. By sending the meta-data with the digital asset, the meta-data is received at the same time as the digital asset.

In certain instances, it is desirable to suspend the creation of meta-data for digital asset. For example, during the installation of other software applications. Typically, when installing software, a program is executing commands that will cause folders to be created. The end-user could be bombarded with requests for categorization for folders. Because of this, there is a special command that can be executed by the end-user of the client 110 that informs the client software 212 to suspend its operation.

With reference to FIG. 14B, a method 1440 of propagating digital asset identification tags across the distributed computing system is shown and described. In one embodiment, the method 1440 includes receiving (step 1450) a command indicating a change to a digital asset identification tag, locating (step 1460) the digital asset identification tag at a central resource, updating (step 1470) the digital asset identification tag, and transmitting (step 1480) the updated digital asset identification tag to other clients that have a copy of the corresponding digital asset.

In more detail, the previously described features of the client software 212 and the server software 312 cooperate to define three states for digital assets within the distributed computing environment 100. The first state is when an end-user creates a digital-asset. In this case, at least one of the client software 212 or the server software 312 is aware of the digital asset from the moment of creation. The second state is when a digital asset is received via e-mail or removable media and has the above-hinting information associated with the digital asset. In the second state, at the client software 212 or the server software 312 monitored the asset from location to location. The third state is when a previously unknown digital asset is discovered in the distributed computing environment 100. For example, when the client software 212 is first installed, all the digital assets of the client 110 appear as new to the client software 212. As such, the client software 212 does not know there are other copies of the same digital assets within the distributed computing environment 100. In the end, the client software 212 and the server software 312 cooperate to ensure that all copies of the same digital assets have the same digital asset identification tag.

When a digital asset having the third state is discovered within the distributed computing environment 100, the client software 212 and the server software 312 cooperate to determine if there is a preexisting copy of the digital asset in the distributed computing environment. This can be accomplished by the server software 312 by inspecting a calculated hash value for the new digital asset. As previously described, each digital asset includes a hash value as part of its digital asset identification tag. In one embodiment, the server software 312 looks up the hash value for each newly discovered digital asset, and if a digital asset identification tag exists the server software 312 "pushes" the digital asset identification tag down to the client immediately. In order to prevent overloading of the server 150, other download schemes are used, which are described in more detail below.

The client software 212 determines that a copy of the digital asset exists within the distributed computing environment 100 when a digital asset is either in state one or state two. This is because in both state one and state two, the digital asset is supplied to the client 110 with hinting information.

Depending on the state of the digital asset, propagating the digital asset identification tag requires different steps. When the client software 212 determines that the digital asset is in state one or two, the client 110 issues a command to the server 150 requesting the most recent asset identification tag. If the client 110 has updated the asset identification tag, the client issues a command that includes the updated asset identification tag and a command to propagate the updated asset identification tag to the clients 110 having a copy of the digital asset. In both cases, the command includes a global unique identifier (e.g., the hash value) of the digital assets.

If the digital asset is in state three (i.e., without hinting information) the client software 212 generates a hash value of the digital asset and issues a "look-up" request to the server software 312. In response, the server 150 searches the store of digital asset identification tags for the hash value. If found, the server 150 returns a message to the client 110 that a digital asset identification tag was found for the digital asset or that no digital asset identification tag was found. If an existing digital asset identification tag is found on the server 150, the digital asset identification tag is propagated to the client 110.

The propagation of the digital asset identification tag can occur using a "push" or "pull" model. In the push model, each time a digital asset identification tag is updated at the server 150 it is propagated immediately to each of the clients 110 having the digital asset. Of course, queuing and other techniques can be implement to control network traffic. In the pull model, the clients periodically, either scheduled or randomly, connect to the server 150 and request any digital asset identification tags that are needed or receive any digital asset identification tags that are queue for deliver to the client 110.

If a schedule connection scheme is used, it is possible that conflicts can occur with respect to the state of an asset identification tag for a digital asset. The client software 212 and the server software 312 cooperate to resolve the conflict. In one embodiment, if a client gets a propagation command and the client's version of the asset identification tag associated with the digital asset includes more information when compared with the digital asset identification tag of the propagation command, the client software generates another propagation command in response. To get in this state, the asset was updated in between update cycles on multiple client machines.

Figure 4:
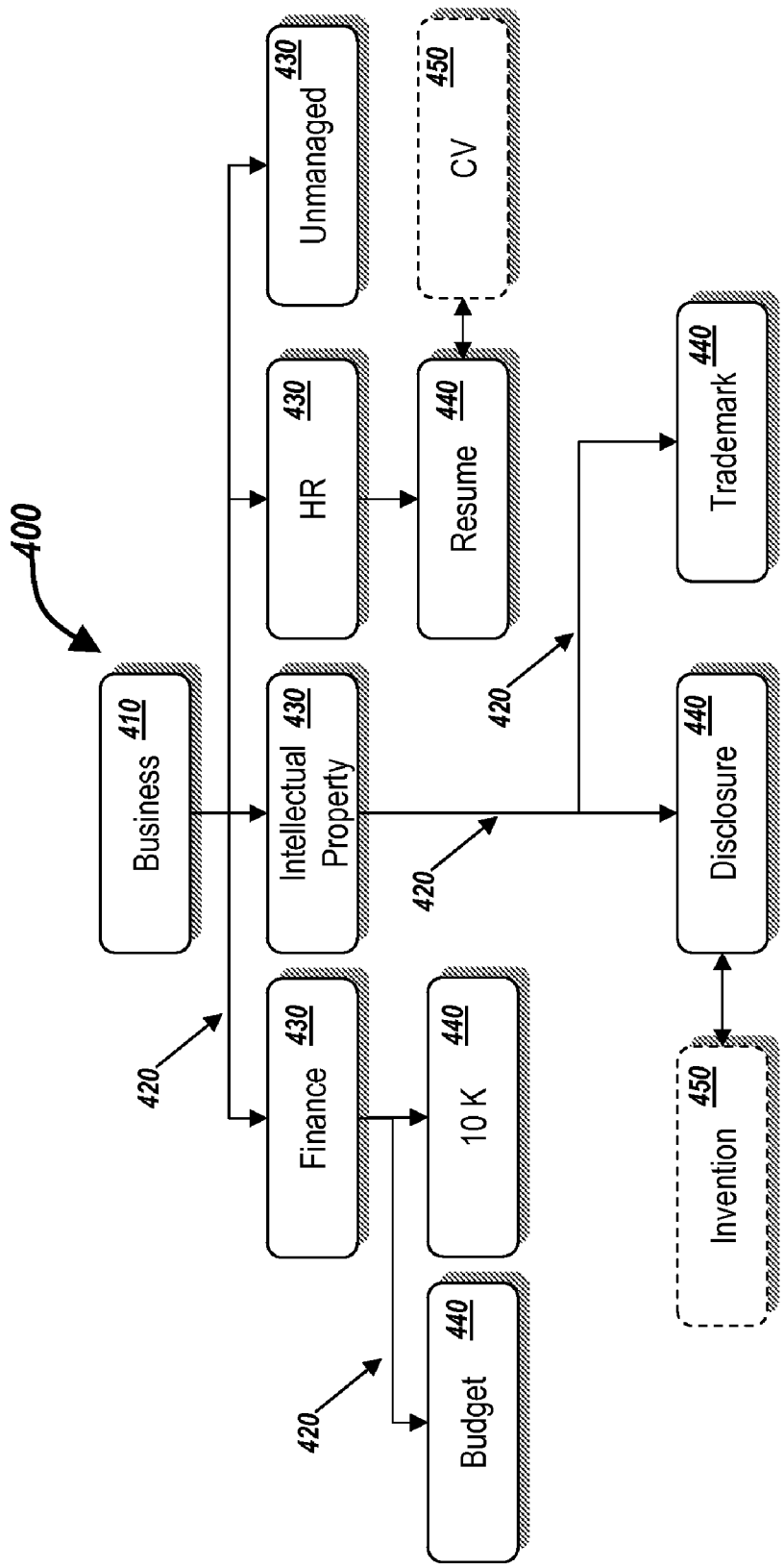
FIG. 4 shows an embodiment of an adaptive taxonomy.

Referring back to FIG. 4, the adaptive feature of the adaptive taxonomy is described. One aspect of the invention is the ability of end-users and administrators to create aliases 450 to taxonomy tags 430 to provide an adaptive taxonomy 440. The aliases can be available only the end-user of the client 110 or available globally to all clients 110. Additionally, an alias can be promoted to taxonomy tag 440. The invention also provides a means to set a policy describing which end-users can create aliases 450. As shown in FIG. 4, the alias 450 labeled "INVENTION" refers to the taxonomy tag 440 labeled "DISCLOSURE." Similarly, the alias 450 labeled "CV" is an alias for the taxonomy tag 440 "RESUME." Each alias inherits each of the rules and categorizations of the taxonomy tag 440 to which it refers.

Figure 15:
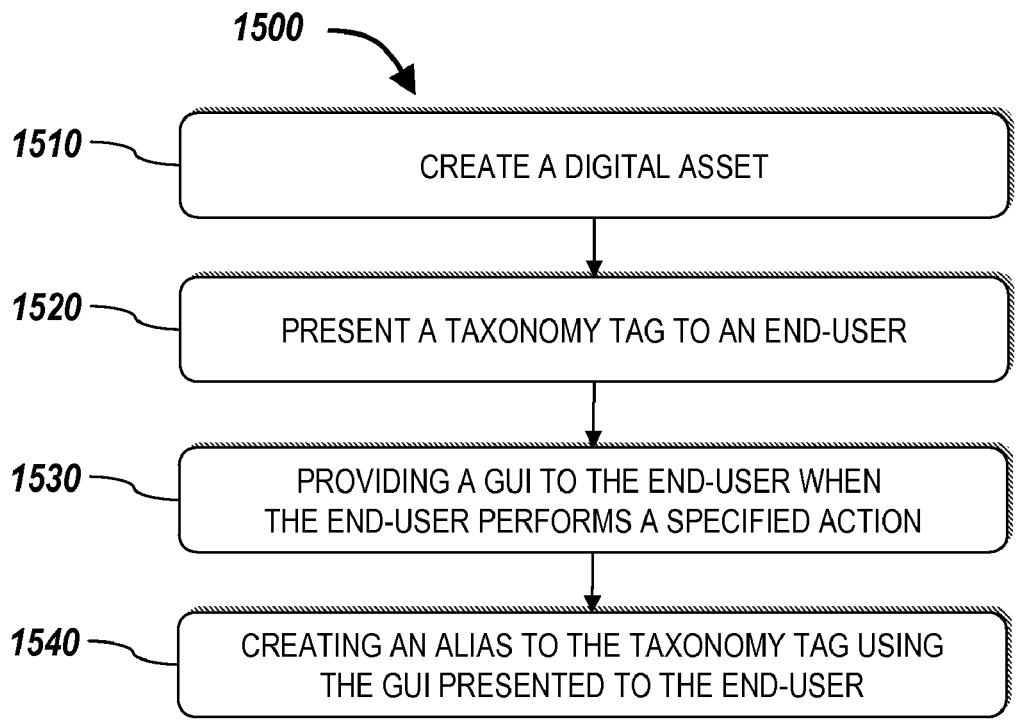
FIG. 15 shows an embodiment of a method of creating an alias to a tag of the adaptive taxonomy of FIG. 4.

With reference to FIG. 15, a method of creating an alias for a taxonomy tag is shown and described. The method includes creating (step 1510) a digital asset, presenting (step 1520) all or a portion of the taxonomy tags 440 to the end-user, providing (step 1530) a graphical user interface to the end-user if the end-user performs a specified action, and creating (step 1540) an alias using the graphical user interface presented to the end-user.

As previously explained the end-user can apply a presented taxonomy tag to a digital asset before the digital asset is saved to the file system of the client 110 or after the digital asset is stored at the client 110. The taxonomy tag 440 categorizes the digital asset and typically includes at least one rule for the digital asset.

The end-user can specifically request the formation of an alias by performing a specified action. The action can be, but is not limited to, selecting a button presented with the taxonomy tags 440 or not selecting one of the presented taxonomy tags. Once the client software 212 determines that the end-user wants to create an alias 450, a graphical user interface is presented to the end-user that allows the end-user to create the alias 450. The end-user supplies a required set of characteristics of the alias. For example, to which taxonomy tag 440 the alias 450 refers and an associated policy. The policy can be the same policy as the taxonomy tag 440 or a more restrictive policy.

The following example is designed to illustrate the adaptive taxonomy features of the invention and is not intended to limit the invention. Referring to FIG. 4, the tag 430 labeled "Resume" that is used to categorize resume information in the HR department. A policy is associated with the Resume tag 440 that implements a first policy "A". After policy A is in place and another end-user of the HR department decides that the department needs a new tag called "CV". The end-user is presented with a graphical user interface that requires the end-user to provide a taxonomy tag 440 to which the alias 450 CV is linked (i.e., Resume), the reason for creating the alias 450, and whether a more restrictive policy "B" should be applied to digital assets tagged with the CV alias 450.

The alias 450 is able to be used by the end-user locally. However, it may be desirable to allow other end-users to use the same alias 450. To the end, the alias 450 is transmitted to the server 150 for review by an administrator.

As previously stated, the server software 312 provides certain features of the invention alone and in combination with the client software 212. Examples of features provided by the server software 312 include, promoting an alias 450 to a tag 430 and modifying the adaptive taxonomy 400, performing unions of meta-data sets for digital assets, and locating digital assets in the distributed computing environment. Each of these features is discussed below in more detail.

An administration reviews the aliases that have been created by the end-users of the client 110 on a periodic basis. Continuing with the above example, if the administrator agrees with the request to make an alias 450 called "CV" the administrator modifies the taxonomy 400 to include the alias 450 CV using the server software 312. As previously mentioned, the alias 450 can have the same policies as the Resume taxonomy tag 440 or a more restrictive policy. The updated taxonomy 400 is transferred to each client 110 the next time the client connects to the server 150.

Alternatively, administrator can deny the alias 450 CV. As a result, the alias 450 CV is only available local to the end-user of the client 110 that created the alias. Said another way, the alias 450 CV is not published to the other clients 110. The end-user can also remove local aliases as needed. As such, the digital asset is then tagged with the taxonomy tag that the alias referred to prior to deletion.

Additionally, the administrator can "promote" an alias 450 to a taxonomy tag 430. In essence, a promotion from an alias 450 to a taxonomy tag 430 has the same effect as adding a new tag 430 to the adaptive taxonomy 400. Continuing with the with above example, if it is later decided that a different policy should be applied to digital assets categorized as a CV versus those categorized as Resumes, the administrator can promote the alias 450 labeled as CV to a taxonomy tag 430 and revise the associated policy for the CV taxonomy tag 430.

It is conceivable that the same digital asset exists on multiple clients 110. Each of the end-users can apply a different taxonomy tag 430 to the digital asset. If the digital asset is a records managed asset, a copy of each of the meta-data sets associated with the digital asset are stored at the server 150. Having different policy information with the same digital asset may allow for circumvention of the desired result of the present invention. To that end, a method of unionizing the meta-data sets for the digital asset is performed by, in one embodiment, the server software 312.

Figure 16:
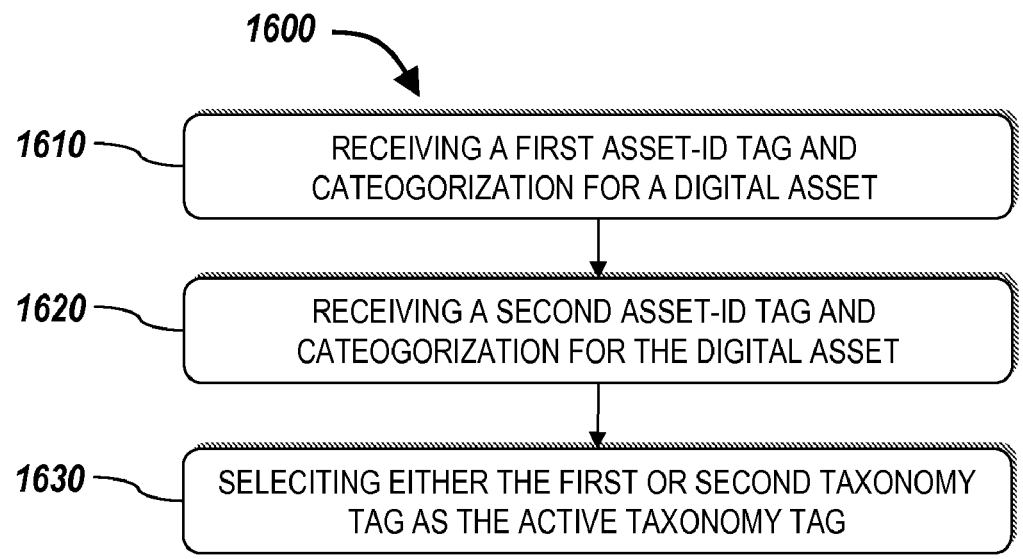
FIG. 16 shows an embodiment of a method of unionizing different meta-data sets for the same digital asset.

One embodiment of a method 1600 of unionizing the associated meta-data tags is shown and described with reference to FIG. 16. The method includes receiving (step 1610) a first meta-data set for a digital asset from a first client 110, receiving (step 1620) a second meta-data set for the same digital asset from a second client 110, and selecting (step 1630) one of the categorizations of the digital asset of as the active categorization. Although the other categorizations are present in the meta-data, only the active categorization and its associated policies are enforced with respect to the digital asset.

Various methods are used to determine which categorization to select. In one embodiment, the more restrictive categorization is selected. For example, the categorization that allows the fewest end-uses to access the digital asset is selected. Other examples include selecting the categorization that allows the largest number of end-users access to the digital asset, selecting the categorization that permits the fewest number of actions to be performed on the file, selecting the categorization that allows the largest number of actions to be performed on the file, selecting the categorization having the earliest association date.

In one embodiment, the following method is used to determine which categorization to select. First a comparison between the retention policies is performed and the categorization having the longer retention policy is applied. If the retention polices are equal, then a comparison of the expiration policies is performed. Again, the categorization having the longer expiration policy is applied. If expiration policies are equal, then the end-user is queried to provide a ranking to each policy to resolve the conflict. In one embodiment, the invention includes a policy analysis engine that analyzes the policies when they are created. In the case of competing polices, the end-user is queried to rank the competing policies to the resolution of competing policy as applied to the digital assets occurs automatically.

Each of the categorization remains with the meta-data set for the digital asset. The not active categorization is not removed from the meta-data set. The reason for this is that different groups or end-users within an organization can view the value of a digital asset. For example, the legal department can view an offer letter as a contract, human resources can view the same offer letter as a salary benchmark, and manufacturing can view the offer letter as just a letter. This information is included as part of the audit information of the meta-data set. The below example illustrates certain aspects of the invention.

Once the server software 312 identifies that the meta-data sets are for the same digital asset the process of unionizing the meta-data set for the digital asset is executed. For purposes of this example, assume that an end-user of a first client categorized a digital asset "General Corporate" and another end-user categorizes the same digital asset as "Budget". Both categorizations are correct, but one is more correct. The server software 312 determines which categorization is stricter and selects that categorization as the active categorization.

The server 150 saves the information for each of the meta-data sets in a master meta-data set for the digital asset. The master meta-data set includes the information from each of the meta-data sets. The master meta-data set becomes the meta-data set for the digital asset and is communicated to each client 110 the next time the client establishes a connection with the server 150.

Although described with reference to the server 150, it should be understood that the client 110 is also capable of unionizing the associated meta-files. The functionality is provided and used by the client software 212. For example when a first file and a second file are each copied and pasted into a third file, the client software 212 performs a union of the first files meta-data the second files meta-data to generate a master meta-data set for the third file.

Figure 17:
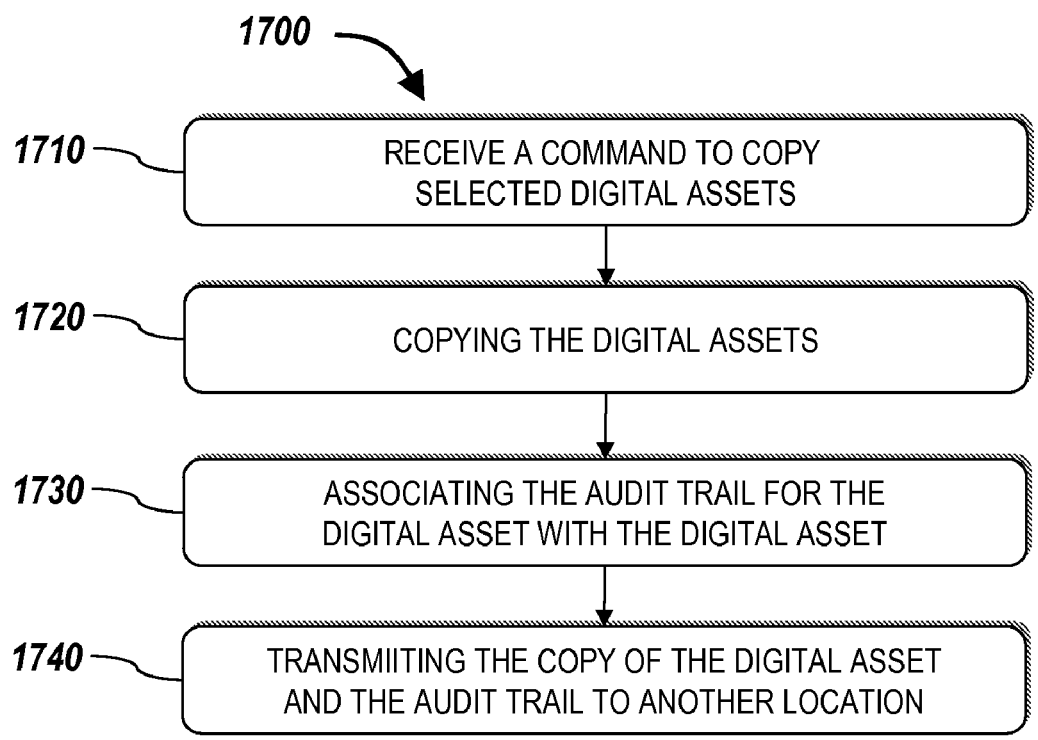
FIG. 17 shows an embodiment of a method of identifying digital assets in the DCE of FIG. 1.

Another feature provided by the invention is the ability to located and freeze the state of digital assets with in the distributed computing environment 100. In one embodiment, this feature is accomplished by the cooperation of the server software 312 and the client software 212. One method of capturing a set of digital assets is shown and described with reference to FIG. 17.

In one embodiment, the method includes receiving (step 1710) by a client 110 an instruction from the server 150 to copy specific digital assets identified by the meta-data for the digital asset, copying (step 1720) the identified digital assets, associating (step 1730) a respective audit trail to each of the respective copied digital asset, and transmitting (step 1740) the digital assets and their associated audit trails to the server 150.

To illustrate some of the features of the invention, the following example is provided. The example illustrates how an administrator of server 150 uses the software system of the invention to select a set of digital assets in the distributed computing environment 100 to be frozen and produced in litigation. The result of this operation is a report of digital assets of interest along with the locations of the information.

Each client 110 periodically checks with server 150 for issued instruction. If an instruction exists, the client 110 receives the instructions. The periodicity can vary and can also be overridden. For example, the end-user of a client 110 can issue a connection request by performing an operation using the client 110. In response to receiving the instructions, the client software 212 analyzes the instructions and begins their execution. In this example, assume the server 150 instructs the client 110 to prevent modification (i.e., freeze) and generate copies of indicated digital assets and their associated meta-data, which includes the audit history of the digital asset. After the server software 212 copies a respective digital asset, that digital asset is released from the hold state so that the end-user of the client can access the digital asset. The client 110 transmits the copy of the digital asset and meta-data to the server 150 or another location as specified in the instructions.

Each client 110 of the distributed computing environment 100 performs the copy operating in parallel with the other clients 110. The server software 312 includes functionality to provide a status report displaying the number or percentage of clients 110 that received the instruction, the number of clients 110 still to receive the instruction, and the number of clients 110 that have completed the copy and transmission operations. It should be understood other progress metrics can be included in the reporting functionality of the invention.

Figure 18:
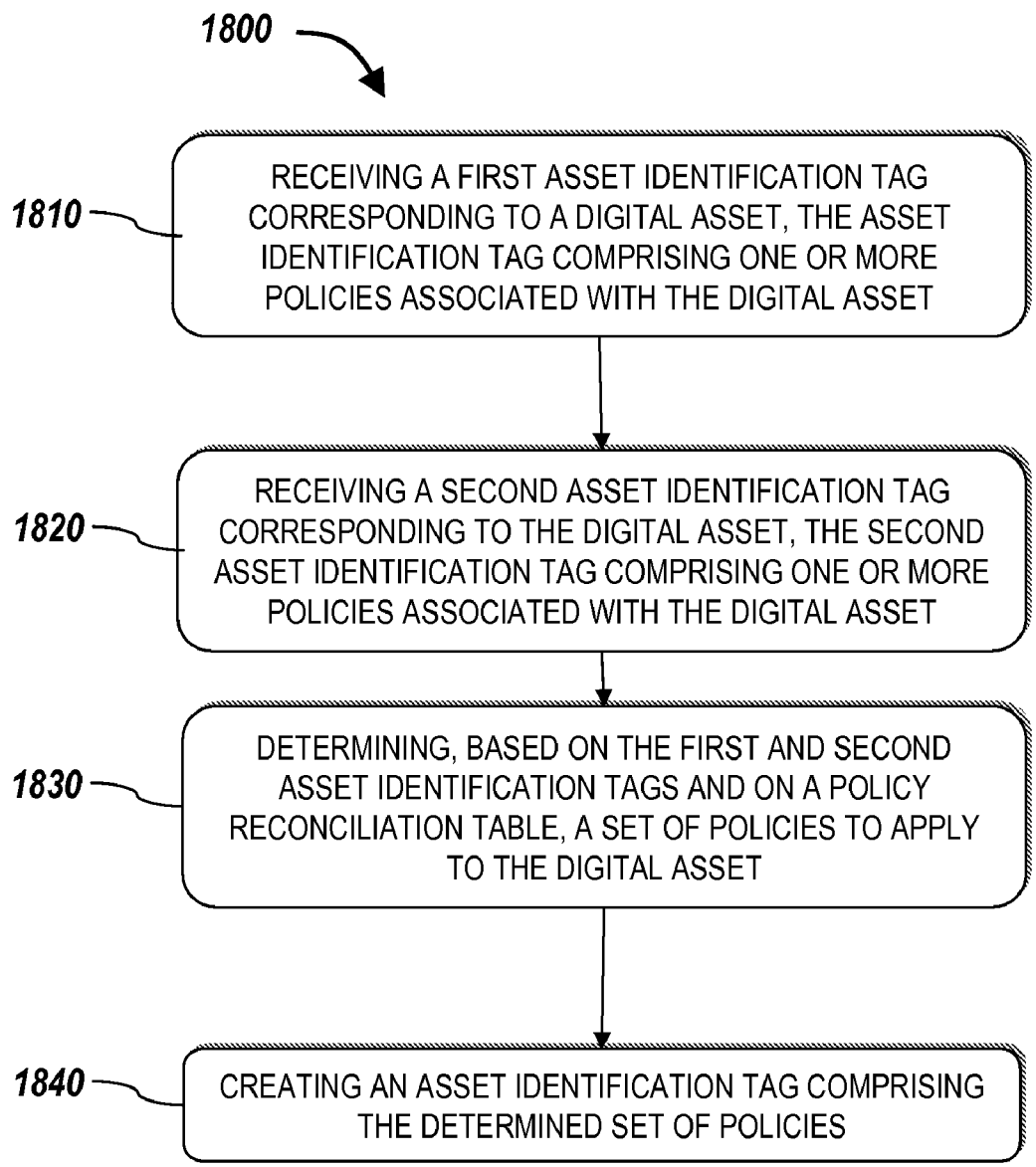
FIG. 18 shows an embodiment of a method for reconciling multiple policies associated with a single digital asset.

Referring now to FIG. 18, a method for reconciling multiple policies associated with a single digital asset is shown. In brief overview, the method 1800 comprises: receiving a first asset identification tag corresponding to a digital asset, the asset identification tag comprising one or more policies associated with the digital asset (step 1810); receiving a second asset identification tag corresponding to the digital asset, the second asset identification tag comprising one or more policies associated with the digital asset (step 1820); determining, based on the first and second asset identification tags and on a policy reconciliation table, a set of policies to apply to the digital asset (step 1830); and creating an asset identification tag comprising the determined set of policies (step 1840). In some embodiments, this method may be performed by an edge computing device, such as a laptop computer, desktop computer, personal digital assistant, and smart phones. In other embodiments, this method may be performed by a server 150.

Still referring to FIG. 18, now in greater detail, the method comprises receiving a first asset identification tag corresponding to a digital asset, the asset identification tag comprising one or more policies associated with the digital asset (step 1810). The asset identification tag may be received by any means. In some embodiments the asset identification tag may be received from an edge device. In some embodiments, the asset identification tag may be received from a server. In other embodiments, the asset identification tag may be received from storage within the computing device performing the method 1800.

The method comprises receiving a second asset identification tag corresponding to the digital asset, the second asset identification tag comprising one or more policies associated with the digital asset (step 1820). The second asset identification tag may be received by any means. In some embodiments the second asset identification tag may be received from an edge device. In some embodiments, the asset identification tag may be received from a server. In other embodiments, the second asset identification tag may be received from storage within the computing device performing the method 1800.

For example, a server may receive, from two different clients, two asset identification tags corresponding to the same digital asset. This may occur as a result of two clients creating an asset identification tag for the asset in succession. As another example, a server may receive an asset identification tag corresponding to a digital asset from a client, where the asset identification tag incorporates a second asset identification tag by reference. The server may then receive the second asset identification tag from the client, or from a database.

The method comprises determining, based on the first and second asset identification tags and on a policy reconciliation table, a set of policies to apply to the digital asset (step 1830). A policy reconciliation table may comprise any table which stores information relating to how two or more policies should be applied when they both correspond to the same aspect of a digital asset. For example, a policy reconciliation table may specify a procedure for reconciling two different audit policies with respect to the same digital asset. Or, for example, a policy reconciliation table may specify a procedure for reconciling three different redacting policies with respect to a digital asset. A policy reconciliation table may be stored as a file, a database, a number of strings, or a decision tree. In some embodiments, the policy reconciliation table may be stored on and/or retrieved from a server.

In one embodiment, a policy reconciliation table may comprise a list of policies, along with a flag denoting a reconciliation procedure for reconciling multiple policies applying to the same aspect of a digital asset. One reconciliation procedure might be to implement all of the policies. For example, if two asset identification tags specify a different location to send auditing logs with respect to a single digital asset, the reconciliation procedure might dictate to send audit logs to both locations. Or, for example, if three asset identification tags specify different prohibited uses for a digital asset, the reconciliation procedure might be to prohibit all of the specified prohibited uses. A second reconciliation procedure might be to implement a given policy if it is specified in any of the asset identification tags. For example, if one asset identification tag contains a policy prohibiting attaching the asset to e-mails, and the other asset identification tag is silent on e-mail attachments, the reconciliation procedure may be to apply the policy that prevents the asset from being attached. Or, for example, if, out of four asset identification tags corresponding to a digital asset, only one requires that the asset be encrypted in storage, the reconciliation policy may be to apply the policy requiring encrypted storage. A third reconciliation procedure might be to implement the policy with the highest indicated priority. For example, if two asset identification tags each set a different expiration date for the digital asset, the reconciliation procedure might be to apply the expiration date contained in the asset identification tag having the highest priority. A fourth reconciliation procedure might be to refuse to accept the second asset identification tag. For example, if the two tags in the above example had the same priority, the reconciliation policy might dictate to refuse to allow the creation of the second asset identification tag with the conflicting expiration date. A fourth reconciliation procedure might be to implement a given policy only if it is specified in all of the assent identification tags.

The method then may comprise creating an asset identification tag comprising the determined set of policies (step 1840). This asset identification tag may be created using any means described herein. In some embodiments, the created asset identification tag may comprise a combination of the received first and second asset identification tags.

Figure 19:
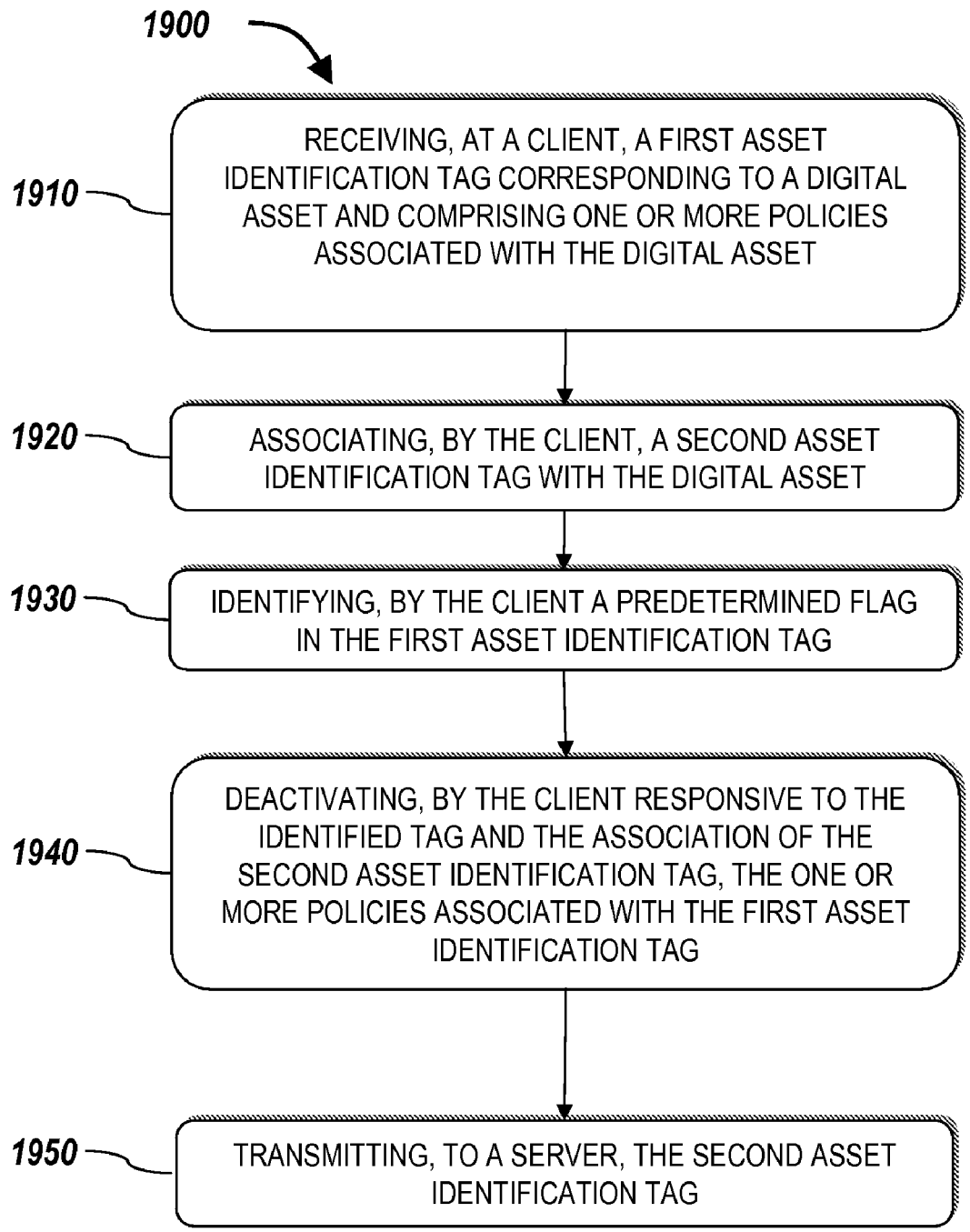
FIG. 19 shows an embodiment of a method for determining a set of policy attributes to be applied to a digital asset.

Referring now to FIG. 19, a method for determining a set of policy attributes to be applied to a digital assets. In brief overview, the method 1900 comprises: receiving, at a client, a first asset identification tag corresponding to a digital asset and comprising one or more policies associated with the digital asset (step 1910); associating, by the client, a second asset identification tag with the digital asset (1920); identifying, by the client a predetermined flag in the first asset identification tag (1930); and deactivating, by the client responsive to the identified tag and the association of the second asset identification tag, the one or more policies associated with the first asset identification tag (1940). Although this method is described below in the context of a client, in other embodiments this method 1900 may be performed by a server 150 or any other computing device.

Still referring to FIG. 19, a client receives a first asset identification tag corresponding to a digital asset and comprising one or more policies associated with the digital asset (step 1910). The first asset identification tag may be received from a server. The first asset identification tag may be received from a memory storage element on the client. In some embodiments, the first asset identification tag may have been created by the client.

The client then associates a second asset identification tag with the digital asset (1920). The client may associate the second asset identification tag according to any embodiments described herein. The second asset identification tag may be received from a server. The second asset identification tag may be received from a memory storage element on the client. In some embodiments, the second asset identification tag may have been created by the client. In some embodiments the second asset identification tag may then be stored on the client. In other embodiments, the second asset identification tag may then be transmitted to a server.

The client then identifies a predetermined flag in the first asset identification tag (1930). The predetermined flag may comprise any notification within the first asset identification tag that the policies of the first asset identification tag should only be applied if it is the only tag associated with the digital asset. This flag may be referred to as an "Active when single" tag, as it denotes that the policies of the asset identification tag will only be applied if the tag is the only tag associated with an asset.

The client then deactivates, responsive to the identified tag and the association of the second asset identification tag, the one or more policies associated with the first asset identification tag (1940). In some embodiments, deactivating the one or more policies may comprise ignoring the policies. In other embodiments, deactivating the policies may comprise deleting the policies and/or the first asset identification tag. As an example of the method 1900, an asset identification tag may be created called Sales which has the "Active when single" flag set. It then has policies associated to the tag that will stop the asset from being attached to an e-mail, copied to a fileserver or copied to any removable media. During installation of the software on an end user's computer, the default tag of Sales may be applied to every information asset on the computer and may be the default for any new asset created. The end user will need to apply another tag to the asset to deactivate the policies associated with the tag Sales. So if the end-user applies a "Brochure" tag to the asset, then it will now be governed by the policies associated with the "Brochure" tag will, in the case of this example, allow one to e-mail it outside of the company.

Figure 20:
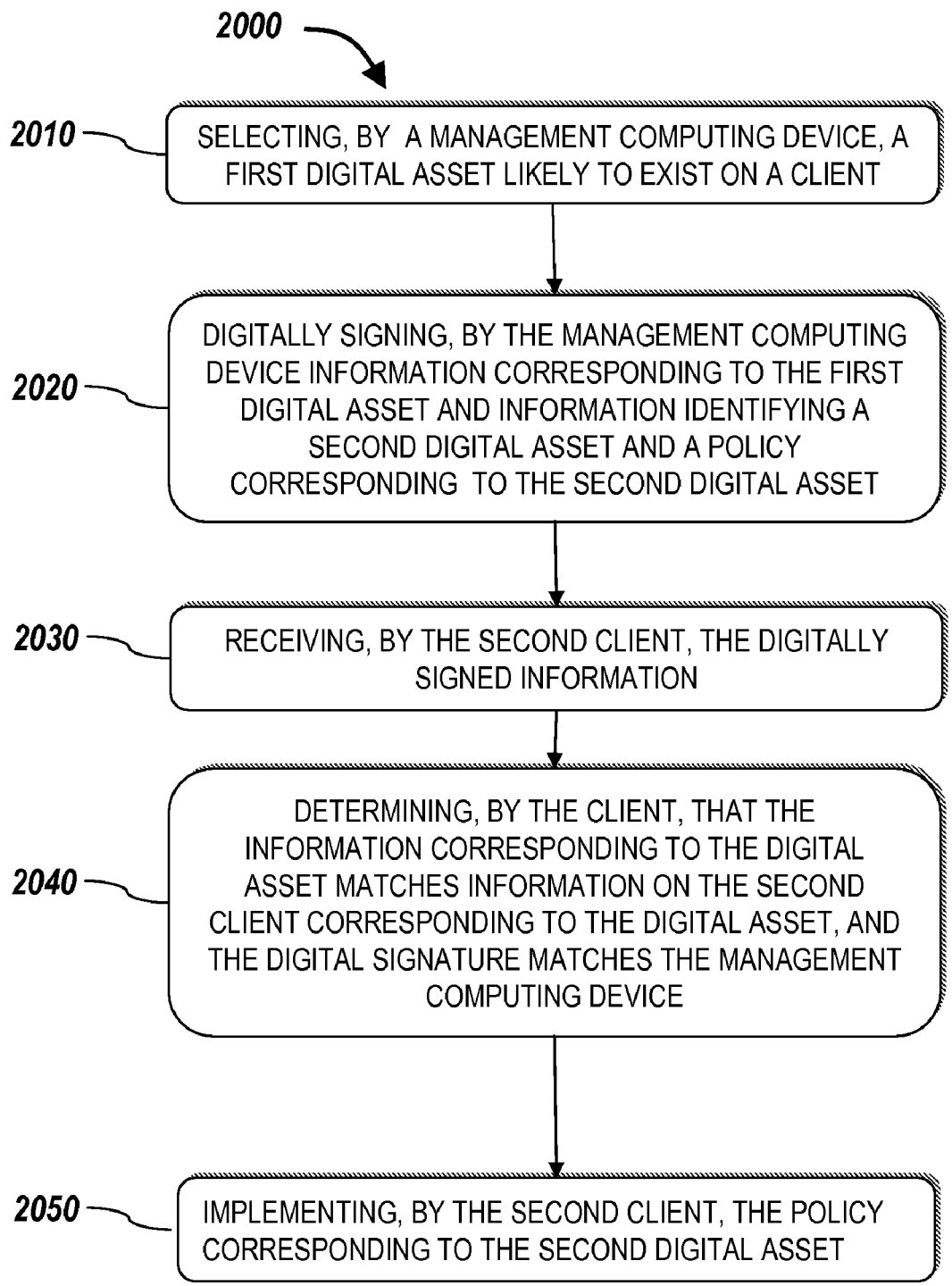
FIG. 20 shows an embodiment of a method for overriding a policy associated with a digital asset on a client computer after determining a centralized policy database is inaccessible.

Referring now to FIG. 20, a method for overriding a policy associated with a digital asset on a client computer after determining a centralized policy database is inaccessible is shown. In brief overview, the method comprises: selecting, by a management computing device, a first digital asset likely to exist on a client (step 2010); digitally signing, by the management computing device information corresponding to the first digital asset and information identifying a second digital asset and a policy corresponding to the second digital asset (step 2020); receiving, by the client, the digitally signed information (step 2030); determining, by the client, that the information corresponding to the digital asset matches information on the client corresponding to the digital asset, and the digital signature matches the management computing device (step 2040); and implementing, by the client, the policy corresponding to the second digital asset (step 2050).

Still referring to FIG. 20, now in greater detail, users of a centralized file management system may have need to change or override file policies during times when they are not connected to the centralized system, or the centralized system is down or otherwise unavailable. In these times and others, a user may contact a file system administrator, for example by calling a help desk. The administrator may then guide the user through the process of overriding a policy. In other embodiments, some or all of the override method may be automated, such as by an automated phone operator, or through a secure web site. The method comprises selecting, by a management computing device, a first digital asset likely to exist on a client (step 2010). The management computing device may comprise any device described herein. The client may comprise any computing device on which a policy needs to be changed. In some embodiments, the management computing device may be operated by a system administrator, IT help desk personnel, or other operator available to assist users. In some embodiments, the management computing device may be connected to a primary centralized file system. In other embodiments, the management computing device may be connected to a backup or archive of a primary centralized file system. The management computing device may select a first digital asset likely to exist on a client using any means to identify assets likely to be on the client. In some embodiments, the selecting may comprise selecting a digital asset known to exist on the client at a previous time. For example, a digital asset may be selected which was known to exist on the client 30 days in the past, 20 days in the past, one week in the past, one day in the past, or at the last time the client was connected to the centralized file system. In some embodiments, an element of randomness may be included in the selection. For example, a digital asset may be randomly selected from a set of digital assets known to exist on the client at least 30 days in the past.

The management computing device may then digitally sign information corresponding to the first digital asset and information identifying a second digital asset and a policy corresponding to the second digital asset (step 2020). The second digital asset may comprise any digital asset for which the user of the client wishes to add, change, or remove a policy. The information identifying the second digital asset may include, without limitation, a file name, a full path name, a digital signature corresponding to the second digital asset, a checksum corresponding to the second digital asset, a creation date, a modification date, and an asset identification tag. The information corresponding to the first digital asset may comprise any information, including file name, full path name, creation date, modification date, asset identification tag, a digital signature corresponding to the first digital asset. In some embodiments, the management computing device may encrypt the information corresponding to the first digital asset and information identifying a second digital asset and a policy corresponding to the second digital asset using a digital signature corresponding to the first digital asset. In some embodiments, the management console may digitally sign a secret string in place of the policy. Upon transmission to the client, the client may then display the secret string to the user, who may then read the secret string back to the administrator, who will then be able to verify that the client successfully received and decrypted the message.

The client may then receive the digitally signed information by any means. In some embodiments, a user of the client may type in the information. For example, if the user is speaking over the phone to an operator, the operator may read the digitally signed information to the user, who then types it into the client. In other embodiments, the information may be received by the client via electronic mail, floppy disk, CD, or any other electronic communication. In some embodiments, a policy override interface screen may be provided on the client for purposes of entering the digitally signed information.

The client may then determine that the information corresponding to the first digital asset matches information on the client corresponding to the first digital asset, and the digital signature matches the management computing device (step 2040). The client may decrypt the information and verify that the information provided matches the clients own records of the digital asset. In some embodiments, the client may decrypt the information using a digital signature corresponding to the first digital asset. In cases where the information does not match, the client may prompt the user to retry, or simply deny any request to change a policy relating to the second digital asset.

The client may then implement the policy corresponding to the second digital asset (step 2050). The policy may comprise any policy described herein. Examples of policies which may be implemented include policies relating to permission to copy, modify, delete, or move a digital asset, policies relating to archiving, policies relating to encrypting of the digital asset, and policies relating to audit logs of the digital asset. In some embodiments, the policy may be configured to expire after a given amount of time. For example, the policy may expire after one hour, one day, or upon the user first reconnecting to the centralized file system.

As an example of the above method, a user may be traveling with a client computing device and have no network connectivity, but need to modify a presentation which has a policy requiring that an audit log be transmitted before and during any modifications. Since the audit log cannot be transmitted, the client may bar the user from modifying the presentation. The user may call an administrator, identify the digital asset the user is trying to modify, and identify the policy that needs to be altered. The administrator may then enter in the information to a management console, which randomly selects a digital asset known to exist on the client computer at least 30 days ago. The management console may then digitally sign information corresponding to the selected asset, and also a policy corresponding to the presentation which allows modification without log transmission (but may still provide for a local log). The information corresponding to the selected asset may be the digital signature that is in the meta data for the asset. This can be the digital signature that the client created and sent to the management system. The administrator may then e-mail or read the output from the console to the user, who will enter it into the client. The client may then confirm the information corresponding to the selected asset, which may assist the client in verifying that the policy override is authentic. The test may be if the digital signature that was sent by the management console matches the digital signature of the asset on the client. The client may then implement the transmitted policy.

Figure 21:
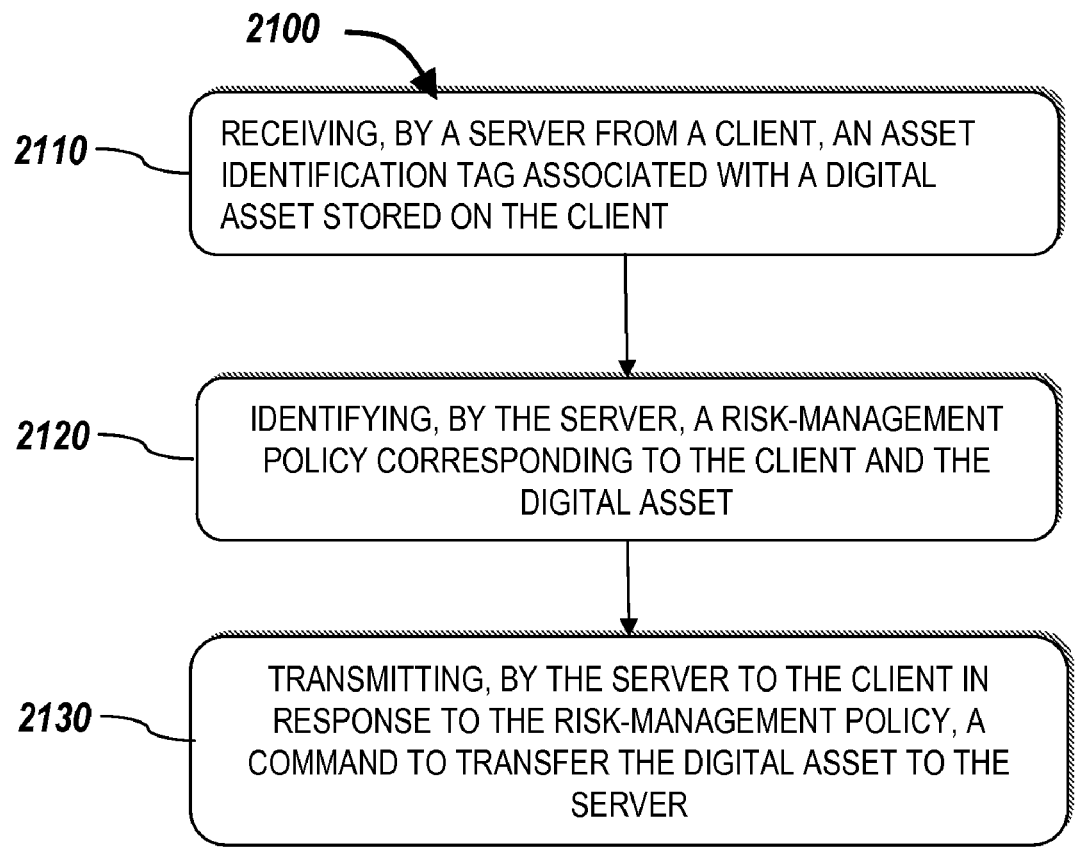
FIG. 21 shows an embodiment of a risk-based method for storing digital assets in a distributed digital asset management environment.

Referring now to FIG. 21, a risk-based method for storing digital assets in a distributed digital asset management environment is shown. In brief overview, the method comprises: receiving, by a server from a client, an asset identification tag associated with a digital asset stored on the client (step 2110); identifying, by the server, a risk-management policy corresponding to the client and the digital asset (step 2120); and transmitting, by the server to the client in response to the risk-management policy, a command to transfer the digital asset to the server (step 2130).

Still referring to FIG. 21, now in greater detail, a risk-based method for storing digital assets in a distributed digital asset management environment comprises receiving, by a server from a client, an asset identification tag associated with a digital asset stored on the client (step 2110). This step may be performed in accordance with any of the embodiments described herein.

The server may then identify a risk-management policy corresponding to the client and the digital asset (step 2120). A risk management policy may comprise any policy which dictates an action to be taken with respect to a digital asset based on one or more risk factors. Examples of risk factors include without limitation risks of data loss, accidental disclosure, accidental modification, data tampering, security breaches, and introduction of viruses and/or malware. Along with this, one could include the risk associated with the device. For example, a laptop which is portable has a higher risk associated with it than a desktop. Another risk factor to be included in the risk factor for the actual asset. Some assets have a high level of privacy requirements and thus have a higher risk factor. This may necessitate that a higher risk asset have a shorter life span on a device. Examples of actions may include moving a digital asset to a centralized storage system, moving a digital asset to a backup system, removing a digital asset from a portable device, encrypting a digital asset, and moving a digital asset into a restricted access area. Other examples may include a risk-based policy comprising moving any digital assets from portable clients to centralized storage if the digital assets have not been access in the past 15 days. Or for example, a risk-based policy may comprise moving any digital assets of a given priority from clients to a secure datacenter. Or for example, a risk-based policy may be to remove a given type or types of digital asset from a client if it is known the client is or will be traveling to an insecure location (e.g. the client has disconnected from the corporate network). The server may identify the risk-management policy corresponding to the client and the digital asset (step 2120) at any time including, without limitation immediately, one minute, one hour, one day, one week, one month, one year, or several years after receiving the asset identification tag.

The server then may then transmit, to the client in response to the risk-management policy, a command to transfer the digital asset to the server (step 2130). This command may be transmitted by any protocol or protocols. After the client receives the command, the client may then transmit the digital asset to the server. The client may transmit the digital asset using any protocol or protocols. In some embodiments, the client may transmit the digital asset transparently to a user of the client, such that it appears to a user of the client that the asset is still located on the client. Any of the methods and systems described herein for implementing centralized file systems may be used to achieve said transparency. In some embodiments, the client may then delete any local copies of the digital asset. The server may receive and store the digital asset using any storage technique, and in accordance with any of the embodiments described for implementing a centralized file system.

Figure 22:
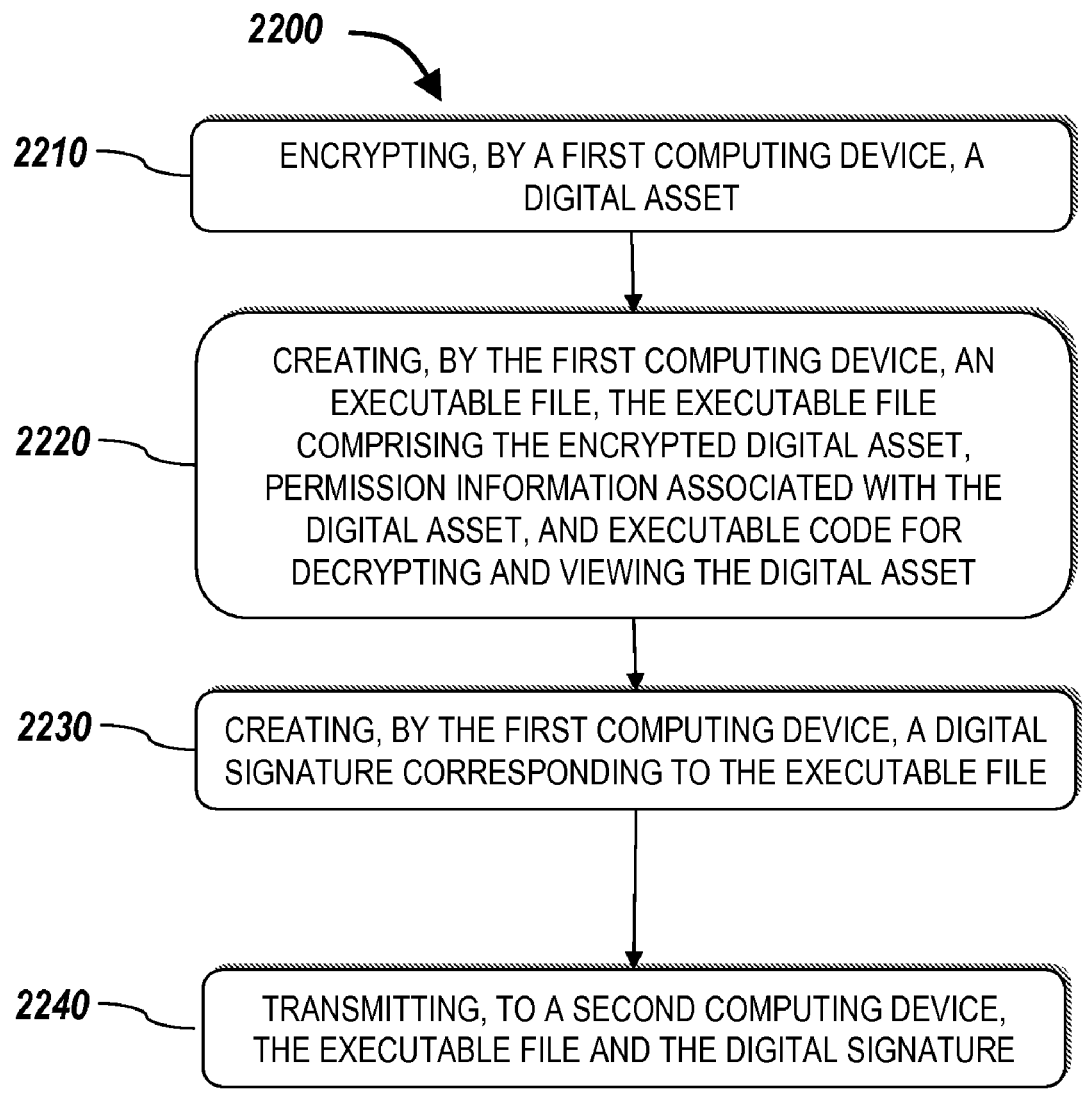
FIG. 22 shows an embodiment of a method for providing secure restricted access to a digital asset.

Referring now to FIG. 22, a method for providing secure restricted access to a digital asset is shown. In brief overview, the method comprises: encrypting, by a first computing device, a digital asset (step 2210); creating, by the first computing device, an executable file, the executable file comprising the encrypted digital asset, permission information associated with the digital asset, and executable code for decrypting and viewing the digital asset (step 2220); creating, by the first computing device, a digital signature corresponding to the executable file (step 2230); and transmitting, to a second computing device, the executable file and the digital signature (step 2240).

Still referring to FIG. 22, now in greater detail, a first computing device encrypts a digital asset (step 2210). The first computing device may comprise a client, server, or any other computing device. The device may encrypt the digital asset using any encryption algorithm. In some embodiments, the device may encrypt the digital asset using a key known to exist on a second computing device which is the intended recipient of the asset. Examples of keys which may be used include, without limitation, processor IDs, machine IDs, and operating system identifiers. The digital asset may comprise any digital asset. In some embodiments, the digital asset may comprise an asset identification tag.

The first computing device may then create an executable file, the executable file comprising the encrypted digital asset, permission information associated with the digital asset, and executable code for decrypting and viewing the digital asset (step 2220). The executable file may comprise any type of executable. In some embodiments, the executable may be a signed executable file, or any other type of executable file which allows a recipient to verify the source. Permission information associated with the digital asset may comprise any information specifying one or more permissions or restrictions on use of the digital asset, including, for example allowing or denying one or more of copying of the asset, moving of the asset, transmitting of the asset, modifying of the asset, and unlimited viewing of the asset. The executable code for decrypting and viewing the digital asset may comprise any executable code which, when executed on a computing device, allows the computing device to decrypt and display the digital asset. In some embodiments, the executable code may only decrypt the digital asset at run time, and only in RAM, such that the decrypted digital asset never exists on the hard drive. In some embodiments, the executable code for viewing the digital asset may restrict a user's ability to interact with or copy the digital asset. For example, the executable code for viewing the document may implement any of the permission information associated with the digital asset, including, for example, preventing the user from modifying, transmitting, copying, and/or saving the digital asset. In other embodiments, the executable code for viewing the digital asset may also comprise executable code for adding comments and/or annotations to the digital asset, and transmitting the annotated digital asset back to the asset creator. In this manner, the creator of a digital asset may be able to send the asset to another user for review, but maintain some security surrounding the digital asset.

The first computing device may then create a digital signature corresponding to the executable file (step 2230). The digital signature may be created according to any digital signature protocol.

The first computing device may then transmit to a second computing device, the executable file and the digital signature (step 2240). This transmission may be done in any protocol, and via any method for transmitting data. In some embodiments, the second computing device may also be connected to a centralized file system. In other embodiments, the second computing device may be operated by a third party and/or an untrusted party. In some embodiments, after being received by the second computing device, the executable file may re-encrypt itself and/or the digital asset, using one or more pieces of information on the second computing device as a key. For example, the executable file may re-encrypt itself with the CPU ID of the second computing device as a key. In this manner, the executable file may be limited from operating on any other computing device. In some embodiments, the executable file may also comprise means for transmitting a read receipt to the first computing device upon successful opening of the digital asset. In other embodiments, the executable file may also comprise means for transmitting an annotated or otherwise modified digital asset back to the first computing device.

In some embodiments, the above method 2200 may be integrated into the first computing device transparently and/or seamlessly with respect to a user of the first computing device. For example, if a digital asset has an associated policy that third parties may not copy or edit the asset, the computing device may automatically perform the method above 2200 upon detecting that the client may be transmitting the asset to a third party, such as by attaching the asset to an e-mail or writing the asset to a disk.

As an example which may use the above method 2200, a Sender may want to send a secure file to a Reviewer who will have the ability to view the file and nothing else. The first operation is to send a Test File from the Sender to the Reviewer. This Test File contains the public key from a key pair owned by the Sender. This key pair is automatically created by the software using known techniques. When the Test File is read by the Reviewer, the software generates a "Return Receipt" meaning that a message is sent back from the Reviewer to the Sender. Note that this should not be confused with the classical e-mail Return Receipt. In this case, it is simply a message sent back by the application. The software on the Reviewer side has created its own key pair and the public key is included in the Return Receipt which is encrypted using the public key from the Sender that was included in the Test File. This transaction has set up the basic infrastructure needed to now send secure information assets from the Sender to the Receiver with only public keys transferred. The Sender software can now destroy the last used key pair and create another. It has the latest public key to use to encrypt the information asset to send it to the Receiver. It will generate a new key pair and include the public key in the message sent to the Receiver. When the Receiver executes the file to view the information asset, it will generate a Return Receipt. Before this is sent, the current Receiver key pair is destroyed and a new key pair is created. The public key is put into the Return Receipt and encrypted using the public key from the Sender and sent back. This can continue with a given key pair being used only once and with no separate key server or other key management required by any other software.

Figure 23:
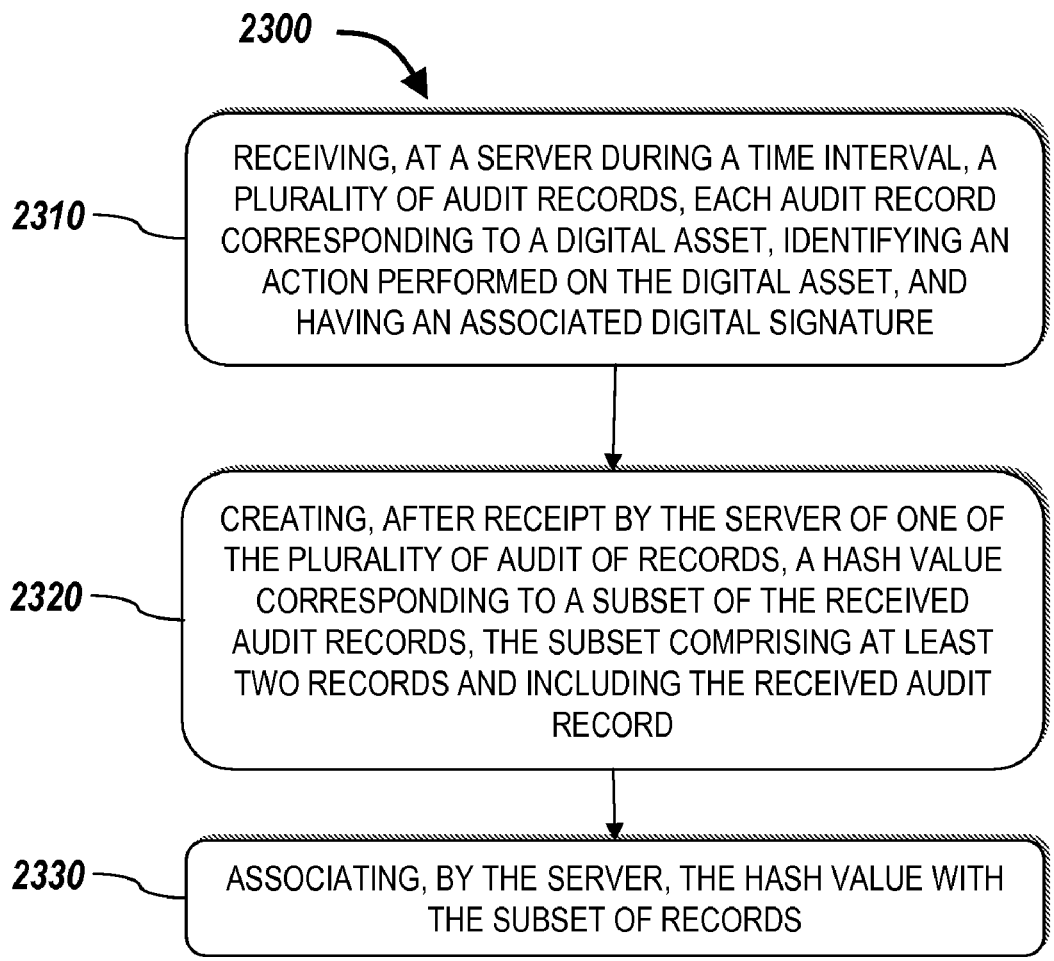
FIG. 23 shows an embodiment of a method for creating verifiable audit record of changes or actions taken on digital assets

Referring now to FIG. 23, a method for creating verifiable audit record of changes or actions taken on digital assets is shown. In brief overview, a server receives a plurality of audit records, each of the audit records corresponding to a digital asset, identifying an action performed on the digital asset, and having an associated digital signature (step 2310). A hash value is created corresponding to a subset of the received audit records, the subset comprising at least two records and including the received audit record (step 2320). The server associates the hash value with the received audit record (step 2330).

Still referring to FIG. 23, and in greater detail, a server receives, during a specified time interval, a plurality of audit records, each of which corresponds to a digital asset, identifies an action performed on the digital asset, and having an associated digital signature (step 2310). The audit records may be received from one or more edge devices such as laptop computers, desktop computers, personal digital assistants, and smart phones. In some embodiments, the audit records are received from the edge devices during a one week, three days, or a 24 hour period. In still other embodiments, the audit records are received from the edge devices over a 12 hour period. In still other embodiments, the audit records are received from the edge devices over a 6 hour period. In further embodiments, the audit records are received from the edge devices on an hourly basis. In still further embodiments, the audit records are received from the edge devices every half hour or every quarter hour. In yet further embodiments, the audit records are received from the edge devices every minute.

Each received audit record corresponds to a digital asset. Each record identifies an action performed on a digital asset and has a digital signature associated with it. In some embodiments, the actions identified by the audit record include open, close, modify, read, printed, e-mailed, saved locally, copied, moved and transmitted. The digital signature associated with the audit record may comply with the Digital Signature Algorithm (DSA). Alternatively, the digital signature may comply with the Elliptic Curve Digital Signature Algorithm (ECDSA). In other embodiments, a proprietary digital signature algorithm may be used.

After receipt of one of the plurality of audit records, the server creates a hash value (step 2320). In some embodiments, the server stores the received audit record. In some of these embodiments, the server stores the received audit record in a relational database. In others of these embodiments, the server stores the received audit record in a flat file database. In still other embodiments, the server maintains the received audit record in volatile memory.

Still discussing step 2320, the server creates a hash value corresponding to a subset of the received audit records which includes at least two records, one of which being the received audit record. In some embodiments, the created hash value corresponds to the complete set of audit records received by the server. In still other embodiments, the subset of audit records used for the hash includes only those audit records received for a predetermined time period. For example, the hash may be created using only those audit records received in the past 24 hours, past 12 hours, past 6 hours, past hour, past half hour, past quarter hour, or past minute. In one embodiment, the server may create the hash value based on complete audit records received. In another embodiment, the server may create the hash value based on a portion of each of two or more audit records. For example, the server may create a hash value based on only the digital signatures of each audit record.

The server may create the hash using any one of a number of hash functions including those from the family of cyclic redundancy checks (including Adler-32, BSD, CRC16, CRC32, CRC32 mpeg2, CRC64, or UNIX V checksum); checksums (including sum 8, sum 16, sum 24, sum 32, or xor8); cryptographic hash functions (including elf64, ed2k, HAVAL, MD2, MD4, MD5, RIPEMD-64, RIPEMD-160, RIPEMD320, SHA1, SHA256, SHA384, SHA512, WHIRLPOOL, Tiger). In some embodiments, the server may maintain a running hash value of audit records received, such that, during the time interval, the hash is updated upon the receipt of a new audit record.

The server associates the hash value with the subset of records (step 2330). For embodiments in which the received audit record is maintained in a relational database, the server may store the hash value in a field corresponding to the row in which the audit record is stored. In other embodiments, the data structure storing the received audit record may include a pointer to the hash value. In still further embodiments, the created hash value is appended to a list of created hash values. In some embodiments, the server may transmit or otherwise make the hash value available to a second server. For example, the server may transmit the hash value to a server operated by an outside auditing firm.

Although previously described in some embodiments as having the clients 110 of the distributed computing environment 100 stores the digital assets, in some embodiments a central repository can be used to store the digital assets. The central repository functions as a file server. In addition, the file server can provide access control and version control when executing the server software 312.

In summary, one feature of the combination of client software 212 and the server software 312 provides is the same or similar level of control as having a computer running software in front of the repository but accomplish this without having the computer. In order to accomplish this goal, each digital asset is stored in a respective repository (e.g., folder) of the file server. Also stored in each respective repository is a relational database. The client software 212 and the server software 312 access the database to ensure that only specific users can access the digital assets.

In one embodiment, all the digital assets are owned by a fictitious user of the client 110 (i.e., someone other than the end-user of the client 110). In one embodiment, the fictitious user is named "information-access". This user name is not given out to any end-users but is available to be used by the client software 212. In some embodiments, the client software 212 includes processes executing under the name information-access. This software alone will have access to the digital assets. The end-user of the client executes other programs that communicate with the processes of information-access using inter-process communications.

In one embodiment, the server software 312 ensures that only one person can access a digital asset for modification at a time. In this embodiment, there is no computer to execute a distributed lock manager. To replace the services provided by the distributed lock manager, the locking facility of the fileserver is used. The server software 312 executing on the file server provides a command that locks and unlocks byte ranges in a file such as the database. This is implemented as an advisory lock meaning that there is no blocking of access commands such as read and write. The server software 312 executes a lock command and if it returns an error, then it is already locked. This facility provides the serialization needed to make sure that two clients cannot check out the same digital asset for modification.

In operation, when either the client software 212 or server software 312 attempts to check out an asset for modification, the software tries to access a lock on the relational database file and if successful, open the database and check if a client 110 checked out the digital asset. If not, the database is updated to record which client 110 checked out the digital asset. Once recorded, the database is unlocked and the digital asset is copied to client 110 from the file server for modification by the end-user.

The following goes through the set of commands that can be executed from the end user client side. Note that the basic interface for the end user is a toolbar that is added to file explorer or other applications that can browse through folder hierarchies on file servers. This toolbar will also have a version number on it that can be selected when checking out a file to specify which version. The version number will be set to the current new version when a given folder is selected so the user knows what is the highest version.

In summary, the check-in process for the digital asset copying the new version of the digital asset (i.e., the modified check-out document) back to the folder from which it was checked out. In addition, the file names of the previous copies of the digital assets are updated to represent the version change. After this, a lock is obtained for the relational database for the asset of interest. Subsequently, the relational database is updated to indicate that the digital asset is no longer locked. Also, any other additional information about the digital asset is written to the relational database. For example, information describing the operations performed on the digital asset are recorded and also a reason for the operation.

By way of example, assume the name of the digital asset is test-docment.doc, then the name of the folder that stores all version of test-document is test-document.doc-folder. The newest version of the test-document.doc has the original name of test_document.doc. All other versions are renamed according to "NNNNNN-test_document.doc" where NNNNNN represents the numeric characters of the version number. In this embodiment, each new version of the digital asset is kept as a complete digital asset.

Figure 24:
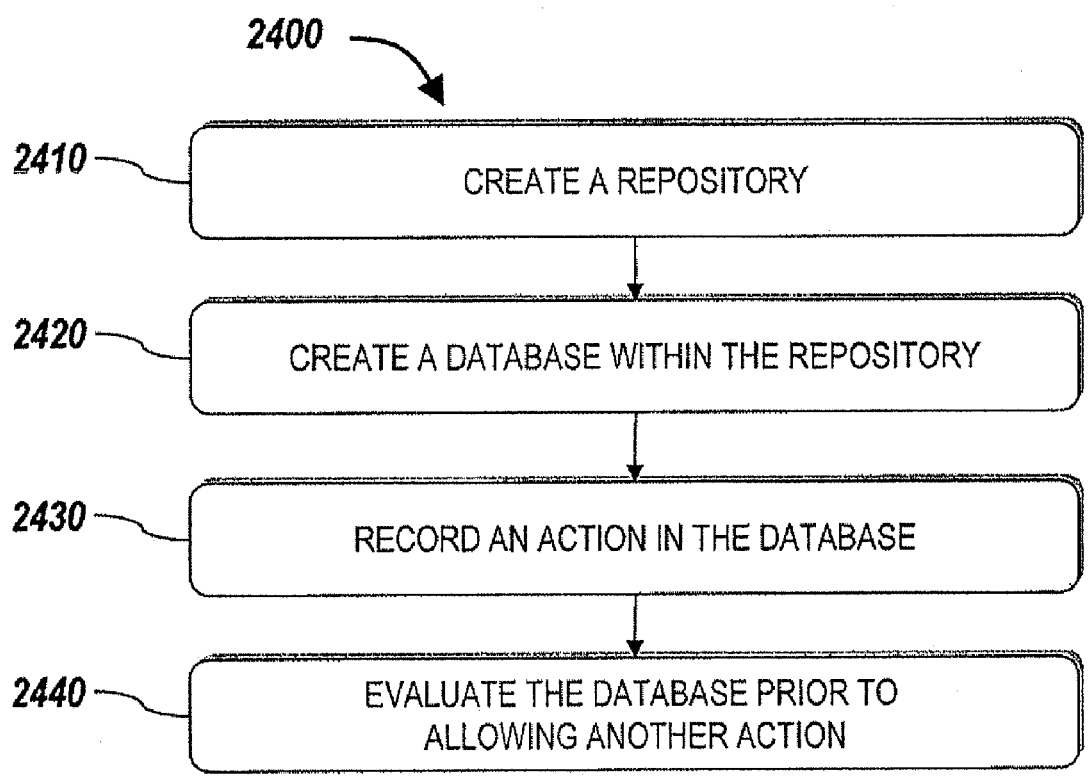
FIG. 24 shows an embodiment of a flow chart of a method of providing controlled access to a digital asset.

With reference to FIG. 24, a method 2400 of providing controlled access to a digital asset of a distributed computing environment is shown and described. In one embodiment, the method 2400 includes creating (step 2410) a repository on a file server, creating (step 2420) a database within the repository, recording (step 2430) an action taken by a client in the database, and evaluating (step 2440) the database prior to allowing another action to occur on the digital asset.

In one embodiment, creating (step 2410) includes creating a new folder on a file server with the ownership of information-access (or some other user name that is not shared with any real person). In addition, a configuration file is placed into this folder that includes information required to check in a new file. The configuration file also contains a template of what to display to the end-user (e.g., an html file) and how that information maps into the required information. This configuration file also contains access control information related to what other clients 110 are allowed to access the repository.

Before any actions can are allowed on the repository, the client creates a connection to the repository. A message is sent via inter-process communications to an application executing as the user information-access. This application accesses the configuration file and determines if the client 110 is allowed access to the repository. If not, the client is shown an error. If access is allowed, the connection is remembered and the repository is displayed to the end-user of the client 110.

In one embodiment, evaluating (step 2440) the database includes determining whether to allow the checking out or checking in of a digital asset. To check out a file, the end-user points their file browser (such as the file browser) to one of the repositories that they can access. After finding and selecting the folder of interest, the check out command is selected on the toolbar, which cause the delivery of an inter-process communication message to application that executing as user information-access. This application has read/write to the file server and all the folders and files within the repository. The application tries to attain a file lock on the first byte of the database in the folder of interest. If it is successful in attaining the file lock, the database is opened. If this access is to check out the asset for modification, the server software 312 or the client software 212 checks the database to determine if another client checked out the digital asset for modification. If the digital asset is already checked out, the request is rejected, the database is closed, and the lock is released. If digital asset can be checked out, a record is written into the database noting the client 110 that checked out the digital asset and the date and time of the check out. In some embodiments, the toolbar can require some text that details why the digital asset was checked out in which case, that text is also recorded in the database Subsequently, the database is closed, the asset is copied to the client 110, and the lock is released. As previously mentioned, the digital asset identification tag of the digital asset is also copied to the client 110.

To check-in a file, the end-user points their file browser (such as the file browser) to one of the repositories that they can access. After finding and selecting the folder of interest, the check-in command is selected on the toolbar, which cause the delivery of an inter-process communication message to application that executing as user information-access. This application has read/write to the file server and all the folders and files within the repository. The application attempts to attain a file lock on the first byte of the database in the folder of interest. If successful in attaining the file lock, the database is opened. A record is written into the database noting the client that is checking in the file and the date and time of the check-in. The toolbar may require some text to detail why it was checked-in and if so, that text is also recorded into the database. Subsequently, the database is closed, the current digital asset is renamed to the next version number as found in the database, and the digital new asset is copied to the file server and the lock will be released. Any modifications to the asset identification tag of the digital asset (or if the asset if brand new then all tags) are associated with the digital asset in the database. Also, during the check-in process, the end-user can also create extra folder hierarchies that simply hold other folders rather than digital assets. If the selected folder is simply a folder rather than an digital asset folder, then a new digital asset folder is created and a new database is created in this folder.

Actions can take place on the file according to what policies have been set for the digital asset. For example, a policy that says if the client checked out the asset and not modified the digital asset in seventy-two hours, then automatically check the digital asset back into the repository.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for providing secure restricted access to a digital asset, the method comprising:
    (a) encrypting, by a first computing device, a digital asset;
    (b) creating, by the first computing device, an executable file, the executable file comprising the encrypted digital asset, permission information associated with the digital asset, and executable code for decrypting and viewing the digital asset;
    (c) creating, by the first computing device, a digital signature corresponding to the executable file; and
    (d) transmitting, to a second computing device, the executable file and the digital signature;
    wherein the executable file further comprises executable code for re-encrypting the digital asset with at least one piece of information corresponding to a computing device which executes the application.

2. The method of claim 1, wherein step (a) comprises encrypting, by the first computing device, the digital asset with an encryption key, wherein the encryption key used comprises a piece of information known to be located on a recipient computing device; and wherein step (d) comprises transmitting, to the recipient computing device, the executable file and the digital signature.

3. The method of claim 1, wherein the executable file further comprises executable code for adding annotations to the digital asset.

4. The method of claim 1, wherein the at least one piece of information includes a system identifier corresponding to the computing device which executes the application.

5. The method of claim 1, wherein the at least one piece of information includes a CPU identifier corresponding to the computing device which executes the application.

6. The method of claim 1, wherein the executable file further comprises at least one additional encrypted digital asset, and executable code for decrypting and accessing the additional encrypted digital asset.

7. The method of claim 1, wherein the digital asset comprises an asset identification tag.

8. A method for providing secure restricted access to a digital asset, the method comprising:
   (a) encrypting, by a first computing device, a digital asset;
   (b) creating, by the first computing device, an executable file, the executable file comprising the encrypted digital asset, permission information associated with the digital asset, and executable code for decrypting and viewing the digital asset;
   (c) creating, by the first computing device, a digital signature corresponding to the executable file; and
   (d) transmitting, to a second computing device, the executable file and the digital signature;
   wherein said executable code does not allow a viewer of the encrypted digital asset to modify or copy the digital asset.

9. A system for providing secure restricted access to a digital asset, the system comprising:
   a processor which encrypts a digital asset; creates an executable file, the executable file comprising the encrypted digital asset, permission information associated with the digital asset, and executable code for decrypting and viewing the digital asset; and creates a digital signature corresponding to the executable file; and
   a file system driver in communication with the processor which writes the executable file and the digital signature to a memory element;
   wherein the executable file further comprises executable code for re-encrypting the digital asset with at least one piece of information corresponding to a computing device which executes the application.

10. The system of claim 9 wherein the processor encrypts the digital asset with an encryption key, wherein the encryption key used comprises a piece of information known to be located on a recipient computing device; and further comprising a transceiver which transmits, to the recipient computing device, the executable file and the digital signature.

11. The system of claim 9 wherein the the executable file further comprises executable code for adding annotations to the digital asset.

12. The system of claim 9 wherein the at least one piece of information includes a system identifier corresponding to the computing device which executes the application.

13. The system of claim 9 wherein the at least one piece of information includes a CPU identifier corresponding to the computing device which executes the application.

14. The system of claim 9, the executable file further comprises at least one additional encrypted digital asset, and executable code for decrypting and accessing the additional encrypted digital asset.

15. The system of claim 9, wherein the digital asset comprises an asset identification tag.

16. A system for providing secure restricted access to a digital asset, the system comprising:
   a processor which encrypts a digital asset; creates an executable file, the executable file comprising the encrypted digital asset, permission information associated with the digital asset, and executable code for decrypting and viewing the digital asset; and creates a digital signature corresponding to the executable file; and
   a file system driver in communication with the processor which writes the executable file and the digital signature to a memory element;
   wherein said executable code does not allow a viewer of the encrypted digital asset to modify or copy the digital asset.

17. A non-transitory computer readable medium having executable instructions thereon to provide secure restricted access to a digital asset, the computer readable medium comprising:
   (a) instructions to encrypt, by a first computing device, a digital asset;
   (b) instructions to create, by the first computing device, an executable file, the executable file comprising the encrypted digital asset, permission information associated with the digital asset, and executable code for decrypting and viewing the digital asset;
   (c) instructions to create, by the first computing device, a digital signature corresponding to the executable file; and
   (d) instructions to transmit, to a second computing device, the executable file and the digital signature;
   wherein the executable file further comprises executable code for re-encrypting the digital asset with at least one piece of information corresponding to a computing device which executes the application.

18. The non-transitory computer readable medium of claim 17, wherein the instructions to encrypt comprise instructions to encrypt, by the first computing device, the digital asset with an encryption key, wherein the encryption key used comprises a piece of information known to be located on a recipient computing device; and wherein step (d) comprises transmitting, to the recipient computing device, the executable file and the digital signature.

19. The non-transitory computer readable medium of claim 17, wherein the executable file further comprises executable code for adding annotations to the digital asset.

20. The non-transitory computer readable medium of claim 17, wherein the at least one piece of information includes a system identifier corresponding to the computing device which executes the application.

21. The non-transitory computer readable medium of claim 17, wherein the at least one piece of information includes a CPU identifier corresponding to the computing device which executes the application.

22. The non-transitory computer readable medium of claim 17, wherein the executable file further comprises at least one additional encrypted digital asset, and executable code for decrypting and accessing the additional encrypted digital asset.

23. The non-transitory computer readable medium of claim 17, wherein the digital asset comprises an asset identification tag.

24. A non-transitory computer readable medium having executable instructions thereon to provide secure restricted access to a digital asset, the computer readable medium comprising:
- (a) instructions to encrypt, by a first computing device, a digital asset;
- (b) instructions to create, by the first computing device, an executable file, the executable file comprising the encrypted digital asset, permission information associated with the digital asset, and executable code for decrypting and viewing the digital asset;
- (c) instructions to create, by the first computing device, a digital signature corresponding to the executable file; and
- (d) instructions to transmit, to a second computing device, the executable file and the digital signature;

wherein said executable code does not allow a viewer of the encrypted digital asset to modify or copy the digital asset.

* * * * *